(12) United States Patent
Welsh et al.

(10) Patent No.: US 10,760,603 B2
(45) Date of Patent: Sep. 1, 2020

(54) APPARATUSES AND METHODS FOR STRUCTURALLY REPLACING CRACKED WELDS IN NUCLEAR POWER PLANTS

(71) Applicant: GE-Hitachi Nuclear Energy Americas LLC, Wilmington, NC (US)

(72) Inventors: Christopher M. Welsh, San Jose, CA (US); Nicholas Kandabarow, Wilmington, NC (US); Barry H. Koepke, Castle Rock, CO (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 0 days.

(21) Appl. No.: 16/036,290

(22) Filed: Jul. 16, 2018

(65) Prior Publication Data

US 2018/0328393 A1 Nov. 15, 2018

Related U.S. Application Data

(62) Division of application No. 15/481,788, filed on Apr. 7, 2017, now Pat. No. 10,024,346, which is a division
(Continued)

(51) Int. Cl.
*G21C 19/20* (2006.01)
*F16B 5/06* (2006.01)
(Continued)

(52) U.S. Cl.
CPC .............. *F16B 5/0607* (2013.01); *B25B 5/00* (2013.01); *B25B 5/08* (2013.01); *B25B 5/10* (2013.01);
(Continued)

(58) Field of Classification Search
CPC ......... F16B 5/0064; G21C 19/207; B23P 6/04
See application file for complete search history.

(56) References Cited

U.S. PATENT DOCUMENTS

| 3,465,995 A | 9/1969 | Whitman |
| 5,392,322 A | 2/1995 | Whitling et al. |

(Continued)

FOREIGN PATENT DOCUMENTS

| EP | 0666574 B1 | 7/1997 |
| JP | H10-505163 A | 5/1998 |

(Continued)

OTHER PUBLICATIONS

European Search Report issued in corresponding European Application No. 15155624.8-1556 dated Jun. 26, 2015.
(Continued)

*Primary Examiner* — Jason L Vaughan
*Assistant Examiner* — Amanda Kreiling
(74) *Attorney, Agent, or Firm* — Harness, Dickey & Pierce, P.L.C.

(57) ABSTRACT

An apparatus configured to structurally replace a cracked weld in a nuclear plant may include: a first body portion that includes a first gripping portion; a second body portion that includes a second gripping portion; a wedge portion between the first and second body portions; and/or an adjustment portion. The first body portion may be configured to slidably engage the second body portion. The wedge portion may be configured to exert force on the slidably engaged first and second body portions. The adjustment portion may be configured to increase or decrease the force exerted by the wedge portion on the slidably engaged first and second body portions. When the adjustment portion increases the force exerted by the wedge portion on the slidably engaged first
(Continued)

and second body portions, a distance between the first and second gripping portions may decrease.

8 Claims, 42 Drawing Sheets

Related U.S. Application Data of application No. 14/184,884, filed on Feb. 20, 2014, now Pat. No. 9,638,227.

(51) Int. Cl.
| | |
|---|---|
| *B25B 5/00* | (2006.01) |
| *B25B 5/08* | (2006.01) |
| *B25B 5/10* | (2006.01) |
| *F16B 2/12* | (2006.01) |
| *F16B 2/24* | (2006.01) |
| *F16B 5/00* | (2006.01) |
| *F16B 35/06* | (2006.01) |
| *G21C 13/02* | (2006.01) |
| *B23P 6/04* | (2006.01) |
| *F16B 39/282* | (2006.01) |
| *F16B 1/00* | (2006.01) |

(52) U.S. Cl.
CPC ............... *F16B 2/12* (2013.01); *F16B 2/245* (2013.01); *F16B 5/0064* (2013.01); *F16B 5/0635* (2013.01); *F16B 35/06* (2013.01); *G21C 13/02* (2013.01); *G21C 19/207* (2013.01); *B23P 6/04* (2013.01); *F16B 39/282* (2013.01); *F16B 2001/0078* (2013.01); *F16B 2005/0678* (2013.01); *Y02E 30/40* (2013.01); *Y10T 29/49947* (2015.01); *Y10T 403/76* (2015.01)

(56) References Cited

U.S. PATENT DOCUMENTS

| | | | |
|---|---|---|---|
| 5,402,570 A | 4/1995 | Weems et al. |
| 5,430,779 A | 7/1995 | Baversten et al. |
| 5,465,278 A | 11/1995 | Cowan, II et al. |
| 5,488,643 A | 1/1996 | Baversten |
| 5,521,951 A | 5/1996 | Charnley et al. |
| 5,530,219 A | 6/1996 | Offer et al. |
| 5,538,381 A | 7/1996 | Erbes |
| 5,574,760 A | 11/1996 | Baversten |
| 5,577,082 A | 11/1996 | Weems et al. |
| 5,588,031 A | 12/1996 | Bevilacqua et al. |
| 5,600,689 A | 2/1997 | Weems et al. |
| 5,600,690 A | 2/1997 | Weems et al. |
| 5,621,778 A | 4/1997 | Erbes |
| 5,623,526 A | 4/1997 | Wivagg |
| 5,659,590 A | 8/1997 | Relf |
| 5,675,619 A | 10/1997 | Erbes et al. |
| 5,683,216 A | 11/1997 | Erbes |
| 5,687,206 A | 11/1997 | Schmidt et al. |
| 5,712,887 A | 1/1998 | Thompson et al. |
| 5,729,581 A | 3/1998 | Loock et al. |
| 5,735,551 A | 4/1998 | Whitman et al. |
| 5,737,379 A | 4/1998 | Erbes |
| 5,737,380 A | 4/1998 | Deaver et al. |
| 5,742,653 A | 4/1998 | Erbes et al. |
| 5,781,603 A | 7/1998 | Wivagg |
| 5,793,828 A | 8/1998 | Wivagg et al. |
| 5,802,129 A | 9/1998 | Deaver et al. |
| 5,803,686 A | 9/1998 | Erbes et al. |
| 5,803,688 A | 9/1998 | Gleason et al. |
| 5,828,713 A | 10/1998 | Schmidt et al. |
| 5,839,192 A | 11/1998 | Weems et al. |
| 5,912,936 A | 6/1999 | Charnley et al. |
| 5,964,029 A | 10/1999 | Weems et al. |
| 5,995,574 A | 11/1999 | Matsumoto et al. |
| 6,067,338 A | 5/2000 | Erbes |
| 6,138,353 A | 10/2000 | Weems et al. |
| 6,167,618 B1 | 1/2001 | Weems et al. |
| 6,178,635 B1 | 1/2001 | McCurdy, Jr. et al. |
| 6,195,892 B1 | 3/2001 | Weems et al. |
| 6,343,107 B1 | 1/2002 | Erbes et al. |
| 6,345,084 B1 | 2/2002 | Jensen |
| 6,345,927 B1 | 2/2002 | Pao et al. |
| 6,371,685 B1 | 4/2002 | Weems et al. |
| 6,390,509 B1 | 5/2002 | Wivagg |
| 6,464,424 B1 | 10/2002 | Weems et al. |
| 6,555,779 B1 | 4/2003 | Obana et al. |
| 6,711,801 B2 | 3/2004 | Pulfer |
| 7,649,970 B2 | 1/2010 | Erbes |
| 7,996,981 B2 | 8/2011 | Dole et al. |
| 2002/0122524 A1 | 9/2002 | Ohno et al. |
| 2003/0234541 A1 | 12/2003 | Thompson |
| 2006/0018421 A1 | 1/2006 | Jensen |
| 2006/0082139 A1 | 4/2006 | Jensen |
| 2009/0140480 A1 | 6/2009 | Morfey |
| 2011/0101177 A1 | 5/2011 | Suganuma et al. |
| 2012/0087456 A1 | 4/2012 | Suganuma et al. |
| 2013/0145605 A1 | 6/2013 | Kajimura et al. |

FOREIGN PATENT DOCUMENTS

| | | |
|---|---|---|
| JP | H11-142572 A | 5/1999 |
| JP | 2001-314994 A | 11/2001 |
| JP | 2002-103240 A | 4/2002 |
| JP | 2008-102140 A | 5/2008 |
| JP | 2009-122101 A | 6/2009 |
| WO | WO-1996/008827 A1 | 3/1996 |
| WO | WO-2009/131146 A1 | 10/2009 |

OTHER PUBLICATIONS

Japanese Office Action for corresponding Application No. 2019-143105, dated Jun. 23, 2020.

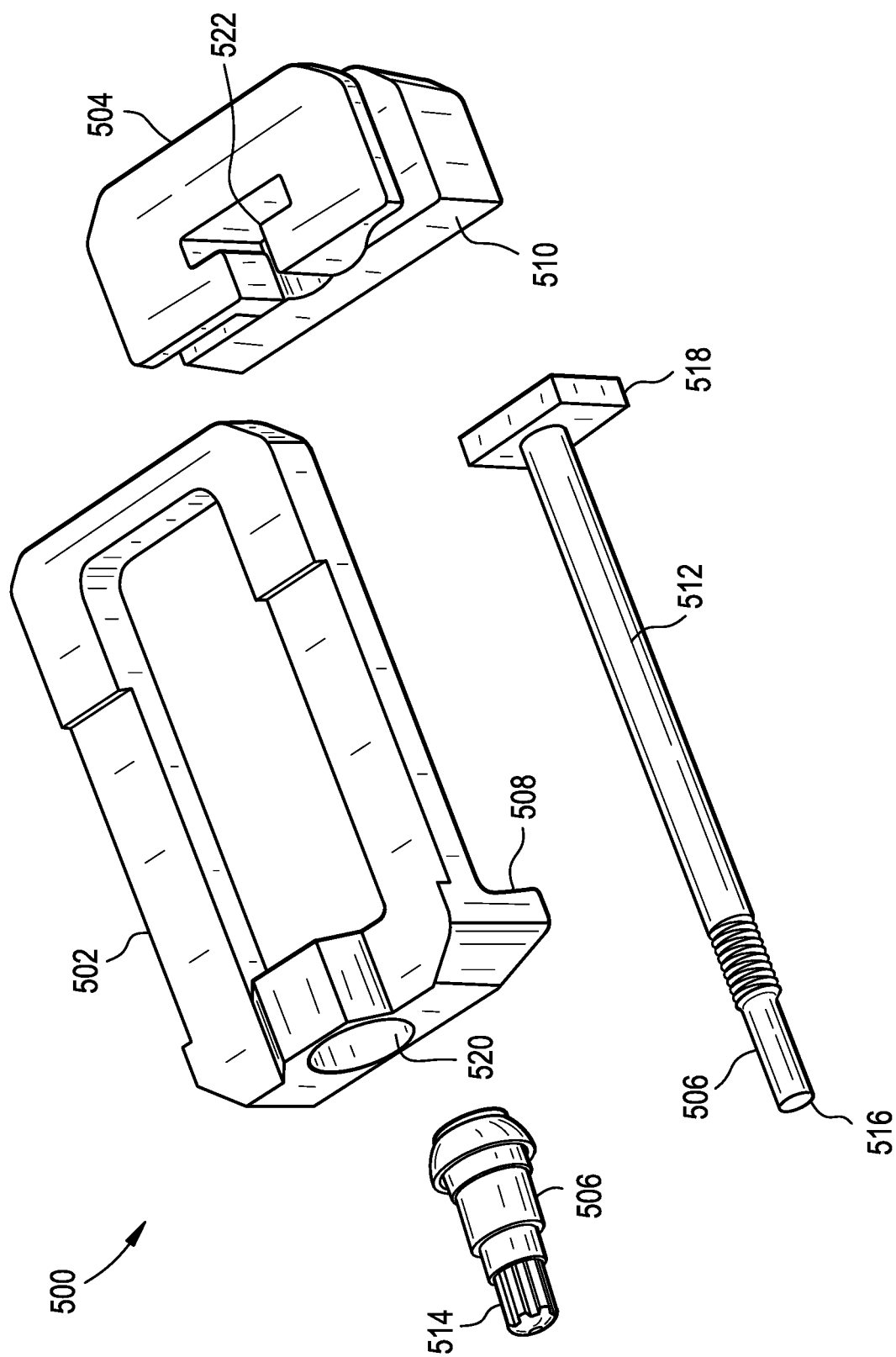

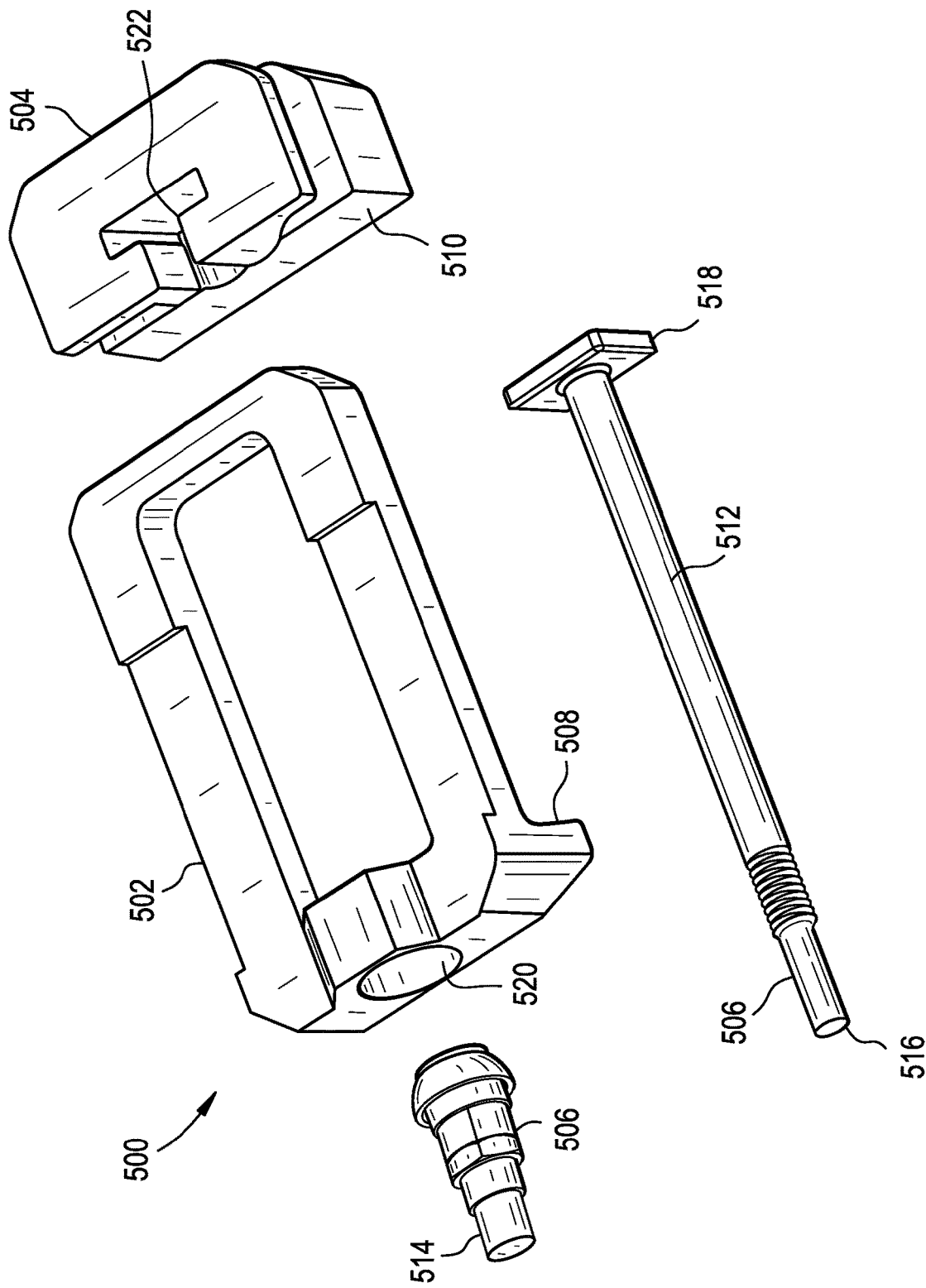

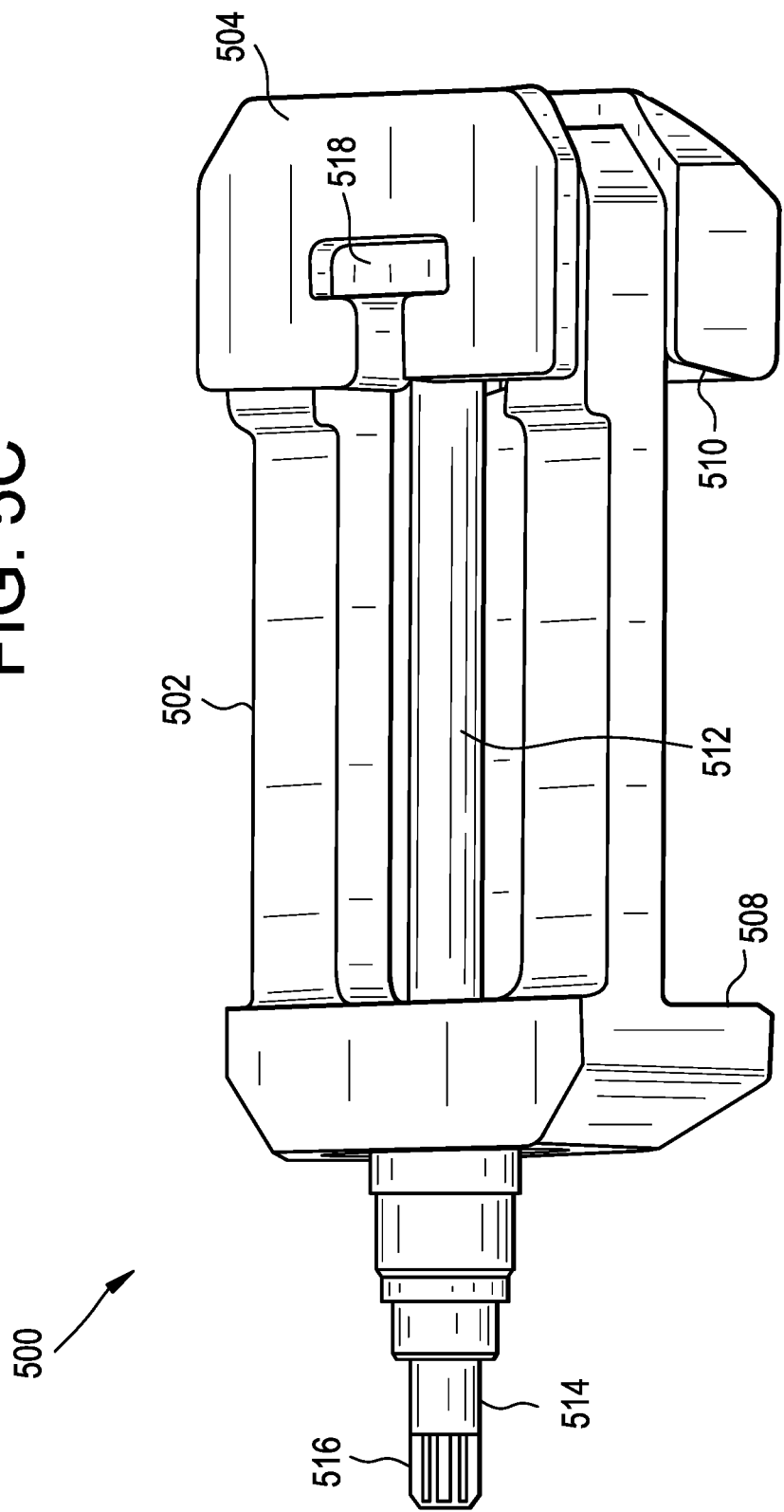

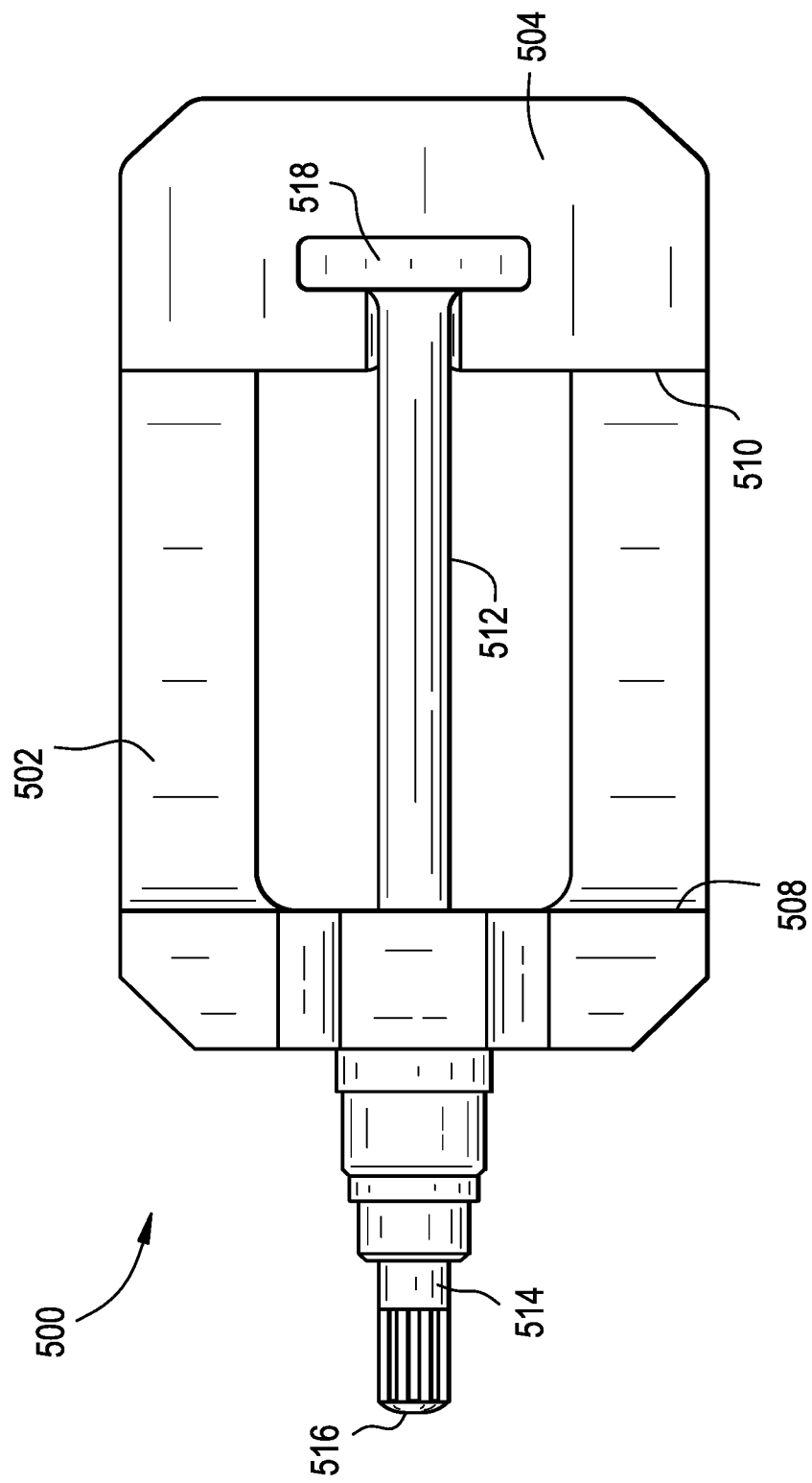

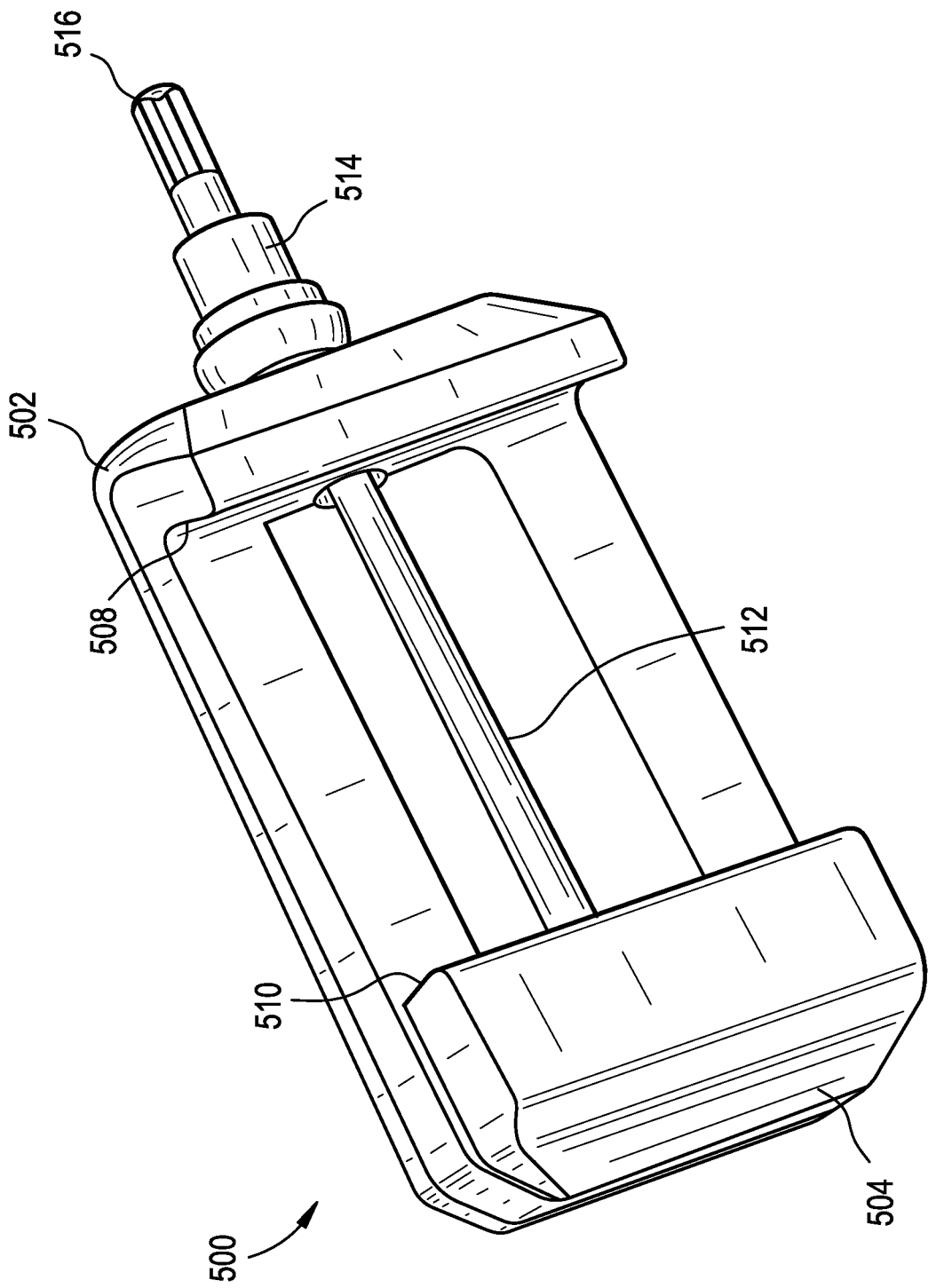

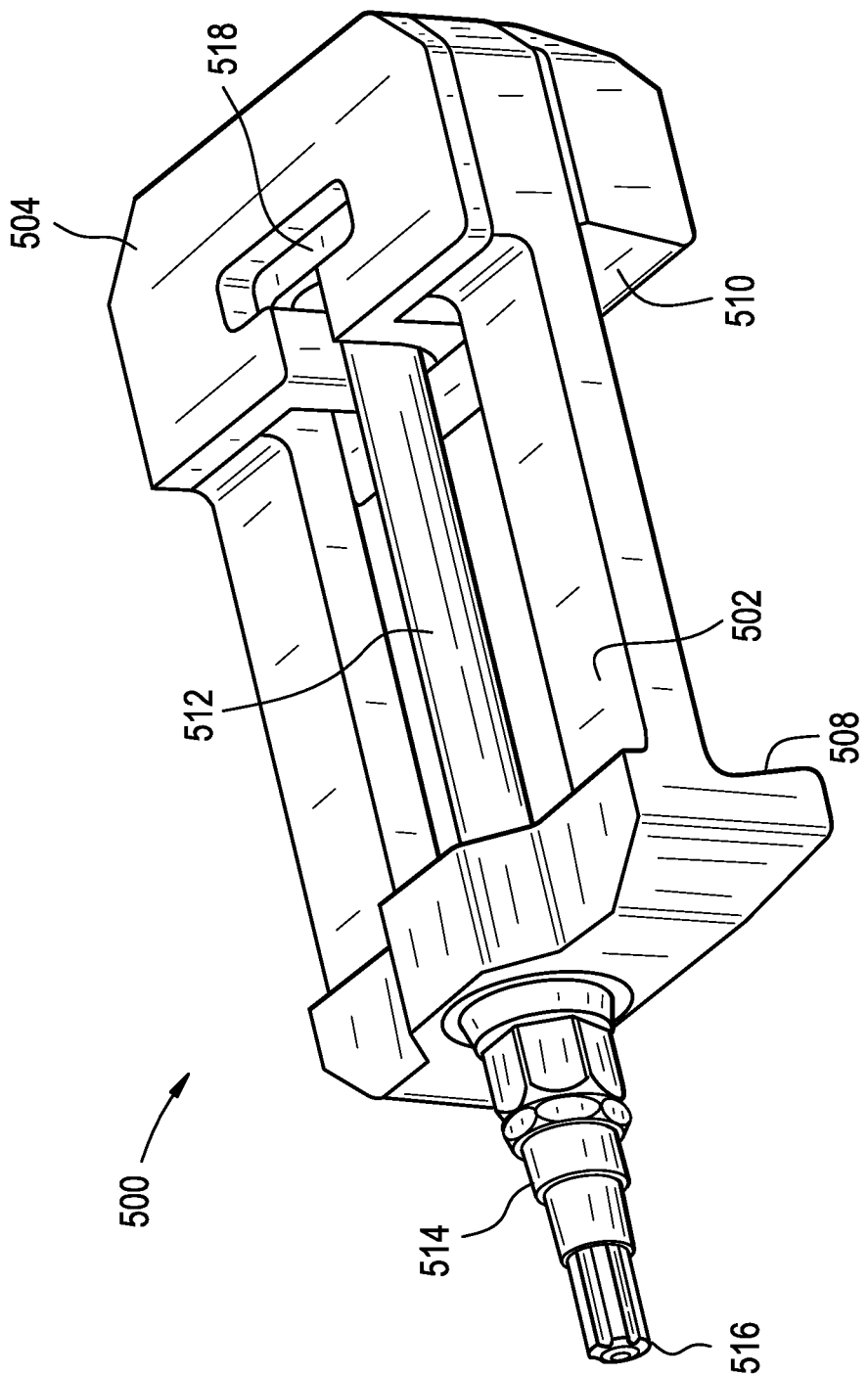

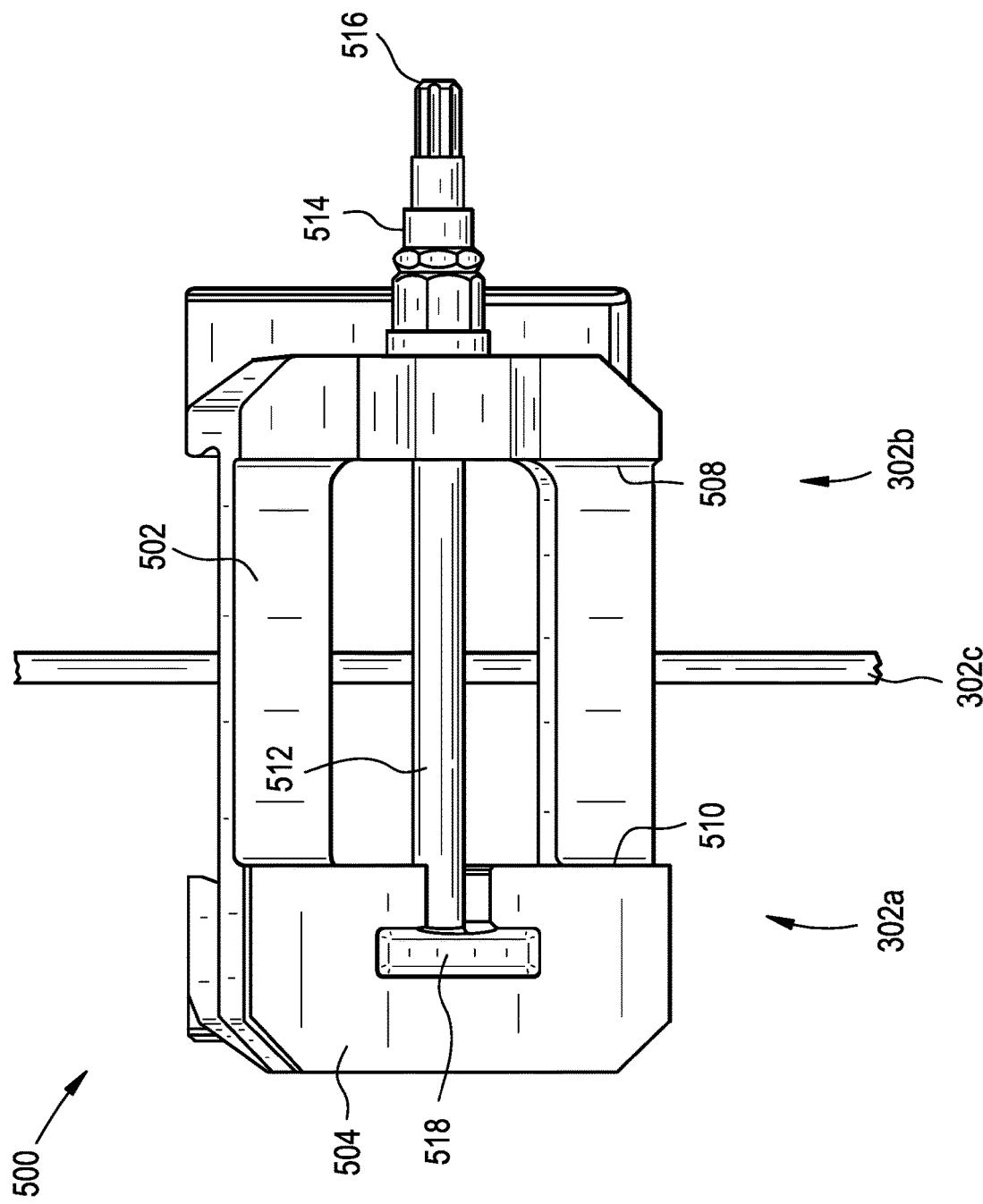

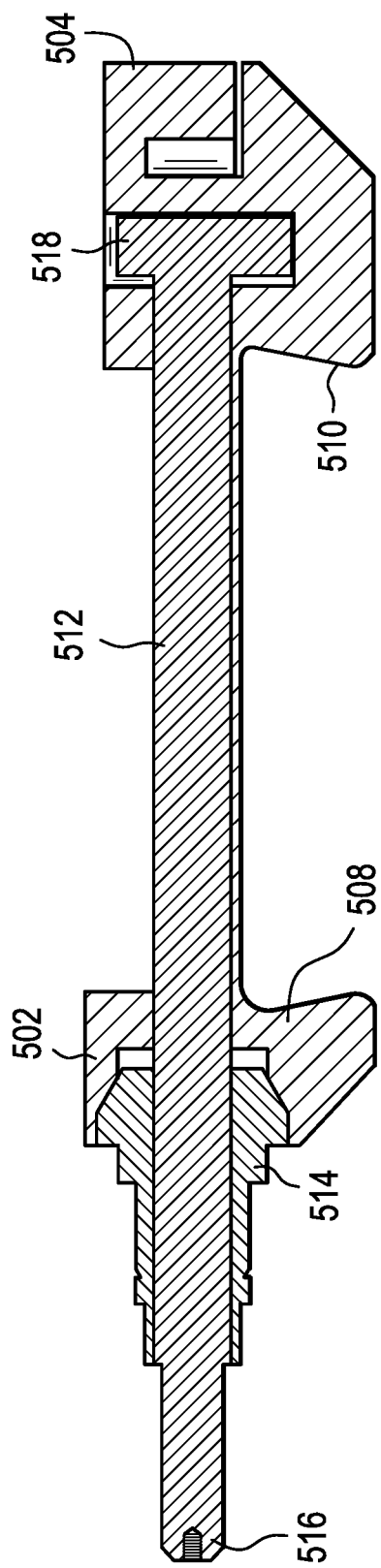

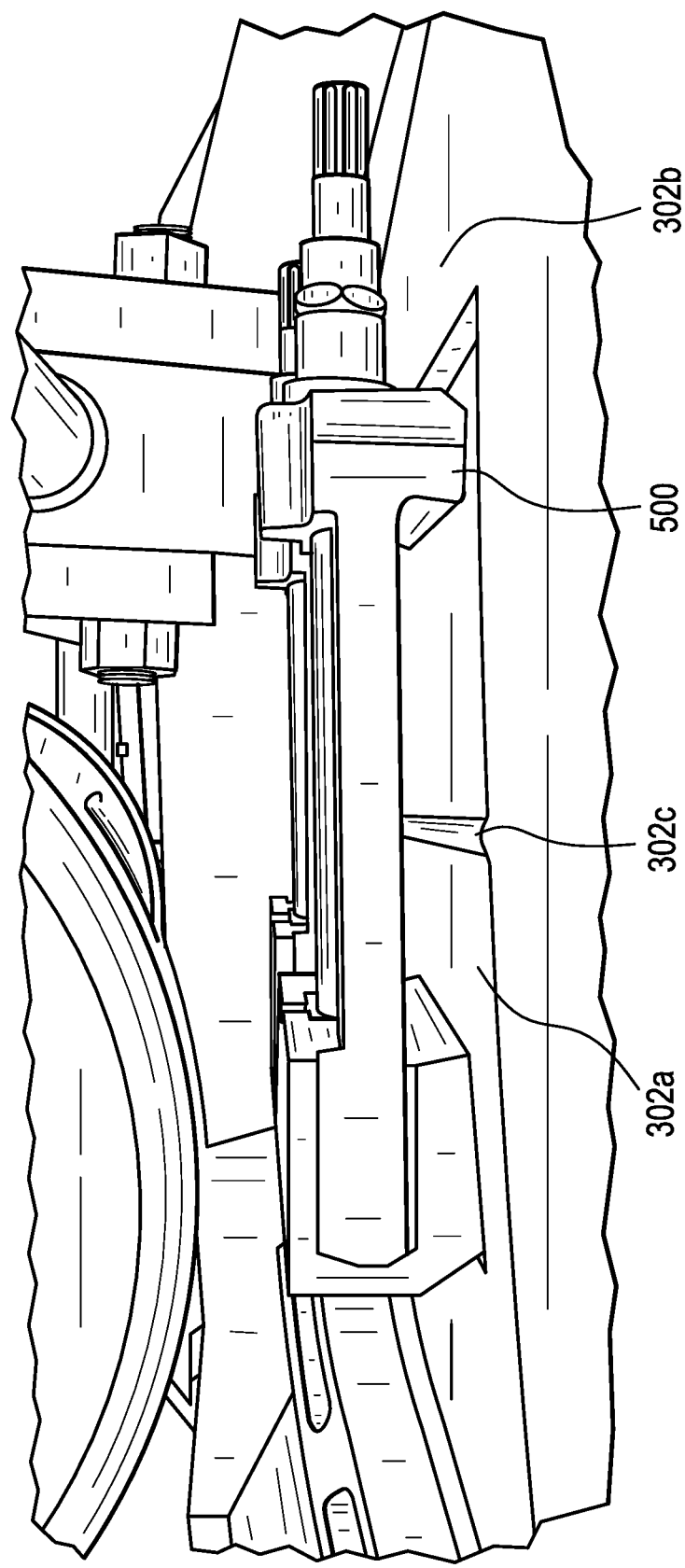

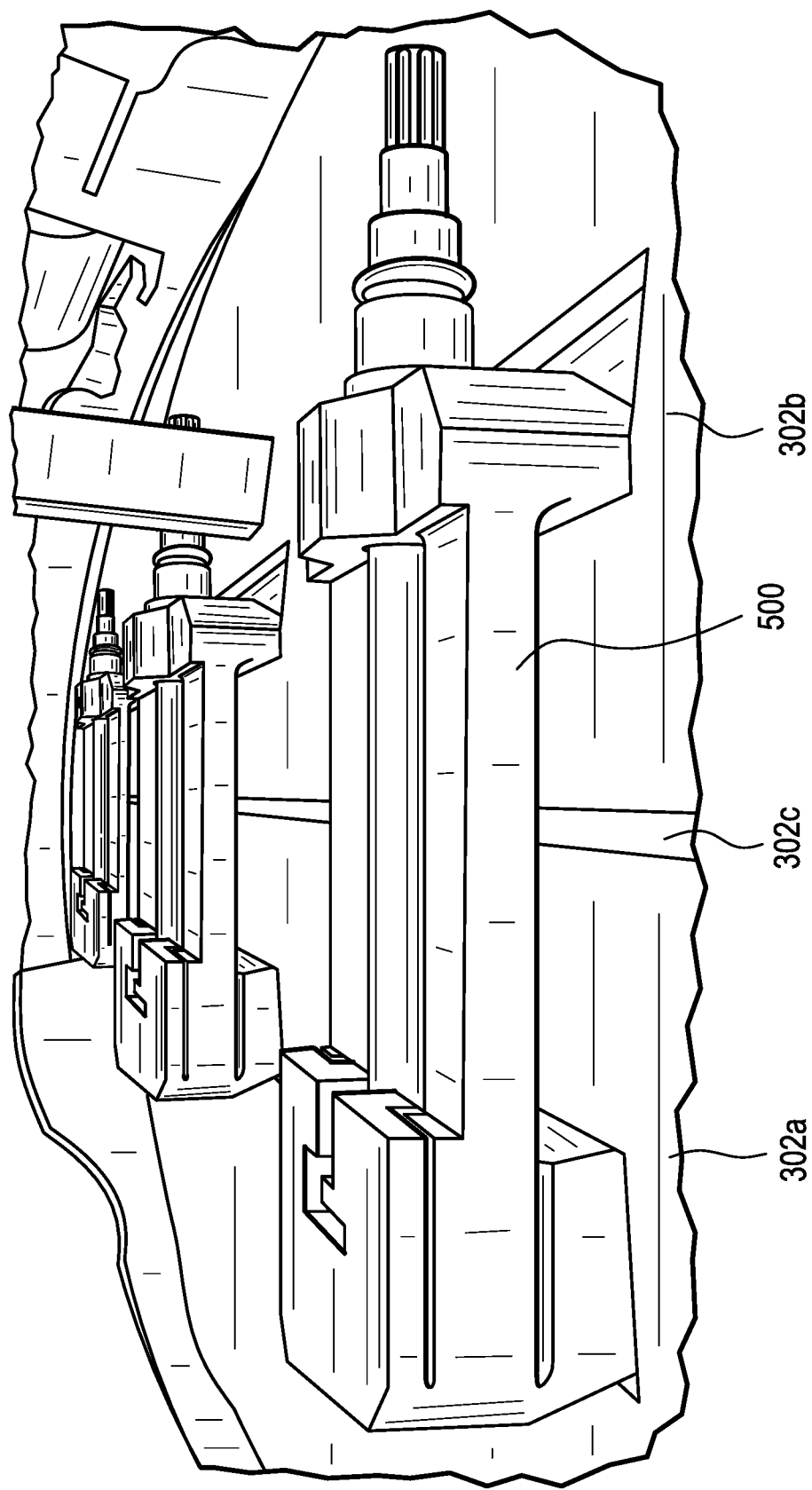

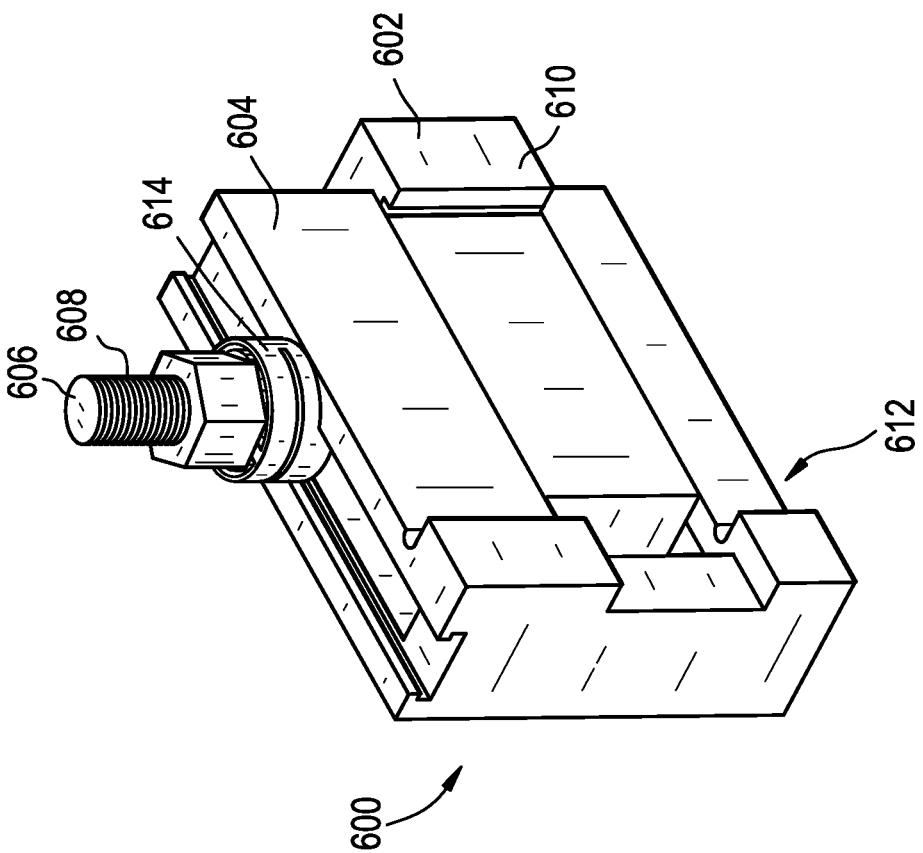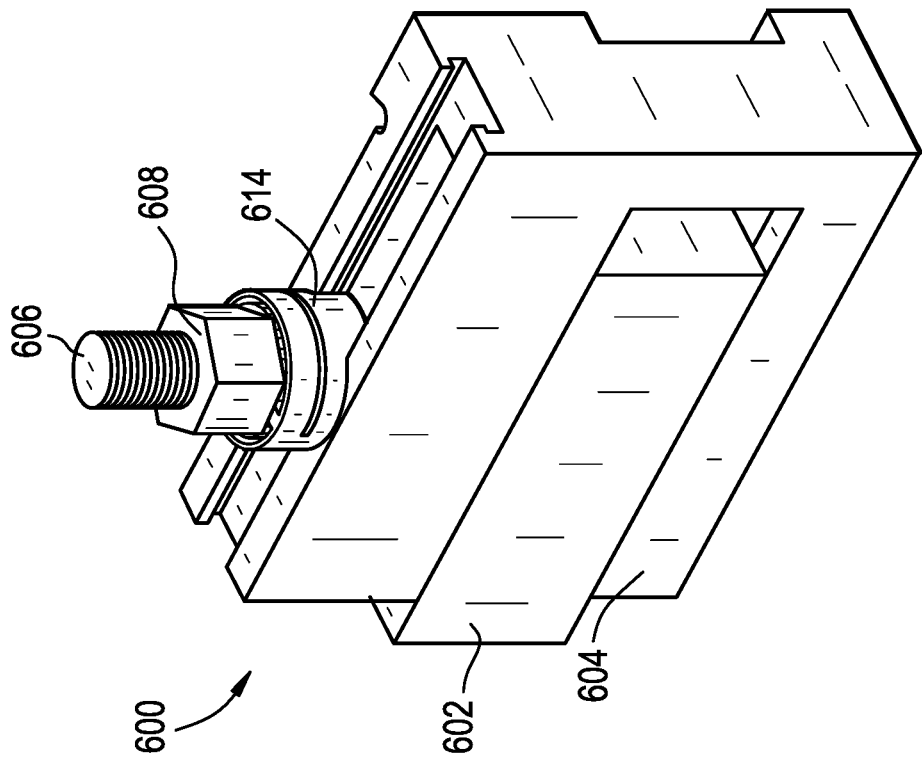

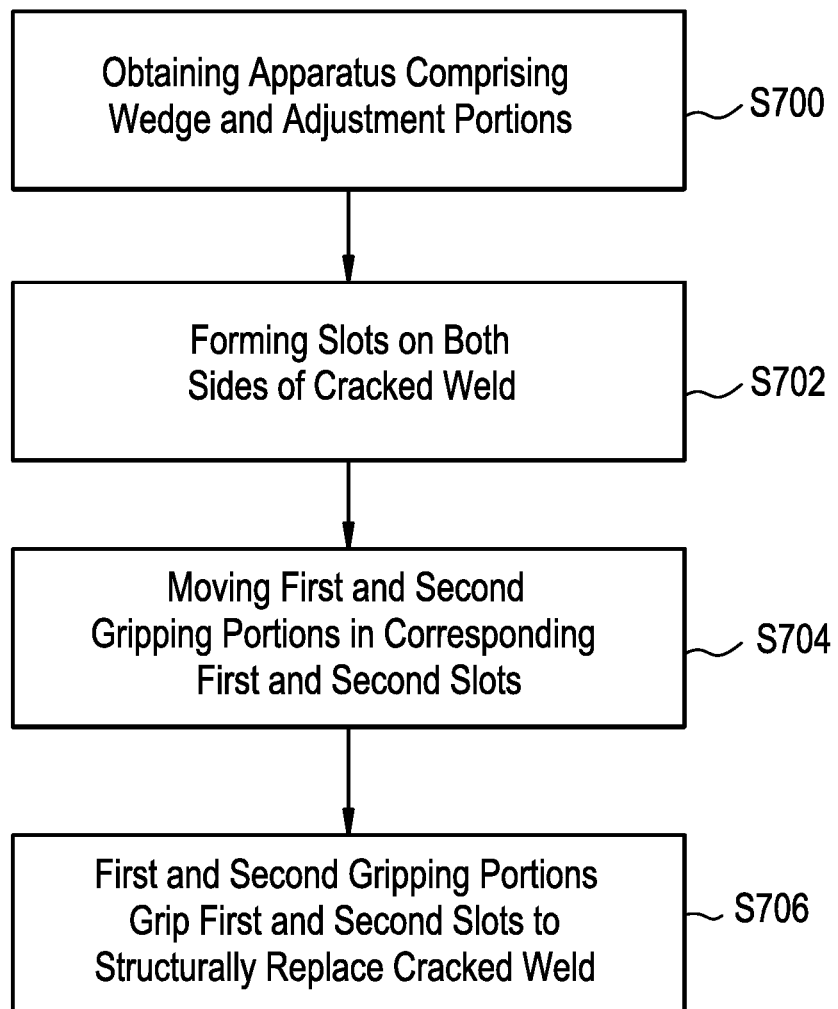

APPARATUSES AND METHODS FOR STRUCTURALLY REPLACING CRACKED WELDS IN NUCLEAR POWER PLANTS

CROSS-REFERENCE TO RELATED APPLICATIONS

This is a divisional of, and claims priority under 35 U.S.C. § 120 to, U.S. application Ser. No. 15/481,788, filed Apr. 7, 2017, which is a divisional of, and claims priority under 35 U.S.C. § 120 to, U.S. application Ser. No. 14/184,884, filed Feb. 20, 2014. The entire contents of each of which are hereby incorporated herein by reference.

BACKGROUND

1. Field

Example embodiments generally relate to apparatuses and methods for structurally replacing cracked welds. Example embodiments also relate to nuclear power plants and to apparatuses and methods for structurally replacing cracked welds of the nuclear power plants.

2. Description of Related Art

In many applications, such as nuclear reactors, steam driven turbines, or water deaerators, high-temperature water may adversely affect the associated structures by contributing to stress corrosion cracks, corrosion, erosion, and so forth. For example, high temperature waters may contribute to stress corrosion cracking ("SCC") in materials, such as carbon steels, alloy steels, stainless steels, nickel-based alloys, cobalt-based alloys, and zirconium-based alloys. SCC may preferentially occur with certain combinations of alloys, environment, and stress.

As would be understood by a person having ordinary skill in the art ("PHOSITA"), SCC may include cracks propagated by static or dynamic tensile stresses acting in combination with corrosion at crack tips. These stresses may result or originate from differences in thermal expansion or contraction between components, relatively high or varying operating pressures, or various processes performed during the manufacture and assembly of the components or system. For example, residual stresses often result from cold working, grinding, machining, and other thermo-mechanical metal treatments. Water chemistry, welding, heat treatment, and radiation may also increase the susceptibility of metal or alloy component to SCC. SCC may be transgranular or intergranular in nature.

SCC may occur at greater rates under various conditions, such as the presence of oxygen, high radiation flux, and so forth. In nuclear reactors such as a pressurized water reactor ("PWR") or a boiling water reactor ("BWR"), high radiation flux may cause radiolytic decomposition of the reactor coolant (water); this decomposition may produce oxygen, hydrogen peroxide, short-lived radicals, and various oxidizing species. These products of radiolytic decomposition may promote SCC in the various system components, such as pipes, pumps, valves, turbines, and so forth. Operating temperature and pressure for a BWR may be about 300° C. and about 10 MPa, and those for a PWR may be about 325° C. and about 15 MPa. Thus, the operating environment for BWRs and PWRs may increase the risk of having SCC issues in nuclear reactor components.

The microstructure of metals and alloys may include grains separated by grain boundaries. Intergranular stress corrosion cracking ("IGSCC") may be a more localized SCC attack along or adjacent to grain boundaries, with the bulk of the grains themselves remaining largely unaffected. IGSCC may be associated with chemical segregation effects (e.g., impurity enrichment at grain boundaries) or with specific phases precipitated at grain boundaries.

Irradiation assisted stress corrosion cracking ("IASCC") may refer to acceleration of SCC by irradiation (e.g., irradiation-induced changes that may involve microstructure changes, microchemical changes, and compositional changes by transmutation). IASCC may result from the effects of beta radiation, gamma radiation, neutron radiation, or other particle radiation (e.g., ions). However, for BWRs and PWRs, IASCC may be primarily due to neutron radiation.

Due to the serious nature of IASCC, the Nuclear Regulatory Commission ("NRC") commissioned a series of studies over about a ten-year period. Some of the reports coming out of these studies included NUREG/CR 5608, "Irradiation-Assisted Stress Corrosion Cracking of Model Austenitic Stainless Steels Irradiated in the Halden Reactor"; NUREG/CR-6892, "Fracture Toughness and Crack Growth Rates of Irradiated Austenitic Stainless Steels"; NUREG/CR-6687, "Irradiation-Assisted Stress Corrosion Cracking of Model Austenitic Stainless Steel Alloys"; NUREG/CR-6915, "Irradiation-Assisted Stress Corrosion Cracking of Austenitic Stainless Steels and Alloy 690 from Halden Phase-II Irradiations"; NUREG/CR-6960, "Crack Growth Rates and Fracture Toughness of Irradiated Austenitic Stainless Steels in BWR Environments"; and NUREG/CR-7018, "Irradiation-Assisted Stress Corrosion Cracking of Austenitic Stainless Steels in BWR Environments".

FIG. 1 is a sectional view, with parts cut away, of reactor pressure vessel ("RPV") 100 in a related art BWR.

During operation of the BWR, coolant water circulating inside RPV 100 may be heated by nuclear fission produced in core 102. Feedwater may be admitted into RPV 100 via feedwater inlet 104 and feedwater sparger 106 (a ring-shaped pipe that may include apertures for circumferentially distributing the feedwater inside RPV 100). The feedwater from feedwater sparger 106 may flow down through downcomer annulus 108 (an annular region between RPV 100 and core shroud 110).

Core shroud 110 may be a stainless steel cylinder that surrounds core 102. Core 102 may include a multiplicity of fuel bundle assemblies 112 (two 2×2 arrays, for example, are shown in FIG. 1). Each array of fuel bundle assemblies 112 may be supported at or near its top by top guide 114 and/or at or near its bottom by core plate 116. Top guide 114 may provide lateral support for the top of fuel bundle assemblies 112 and/or may maintain correct fuel-channel spacing to permit control rod insertion.

The feedwater/coolant water may flow downward through downcomer annulus 108 and/or into core lower plenum 118. The coolant water in core lower plenum 118 may in turn flow up through core 102. The coolant water may enter fuel assemblies 112, wherein a boiling boundary layer may be established. A mixture of water and steam may exit core 102 and/or may enter core upper plenum 120 under shroud head 122. Core upper plenum 120 may provide standoff between the steam-water mixture exiting core 102 and entering standpipes 124. Standpipes 124 may be disposed atop shroud head 122 and/or in fluid communication with core upper plenum 120.

The steam-water mixture may flow through standpipes 124 and/or may enter steam separators 126 (which may be, for example, of the axial-flow, centrifugal type). Steam separators 126 may substantially separate the steam-water mixture into liquid water and steam. The separated liquid water may mix with feedwater in mixing plenum 128. This mixture then may return to core 102 via downcomer annulus 108. The separated steam may pass through steam dryers 130 and/or may enter steam dome 132. The dried steam may be withdrawn from RPV 100 via steam outlet 134 for use in turbines and other equipment (not shown).

The BWR also may include a coolant recirculation system that provides the forced convection flow through core 102 necessary to attain the required power density. A portion of the water may be sucked from the lower end of downcomer annulus 108 via recirculation water outlet 136 and/or may be forced by a centrifugal recirculation pump (not shown) into a plurality of jet pump assemblies 138 (only one of which is shown) via recirculation water inlets 140. Jet pump assemblies 138 may be circumferentially distributed around core shroud 110 and/or may provide the required reactor core flow.

As shown in FIG. 1, a related art jet pump assembly 138 may include a pair of inlet mixers 142. A related art BWR may include 16 to 24 inlet mixers 142. Each inlet mixer 142 may have an elbow 144 welded to it that receives water from a recirculation pump (not shown) via inlet riser 146. An example inlet mixer 142 may include a set of five nozzles circumferentially distributed at equal angles about the axis of inlet mixer 142. Each nozzle may be tapered radially inwardly at its outlet. Jet pump assembly 138 may be energized by these convergent nozzles. Five secondary inlet openings may be radially outside of the nozzle exits. Therefore, as jets of water exit the nozzles, water from downcomer annulus 108 may be drawn into inlet mixer 142 via the secondary inlet openings, where it may be mixed with coolant water from the recirculation pump. The coolant water then may flow into diffuser 148.

FIG. 2 is a schematic diagram showing a developed azimuthal view of the interior of a related BWR core shroud that comprises a plurality of shell sections, having vertical seam welds, that are welded together, one upon the next, by horizontal seam welds.

As shown in FIG. 2, core shroud 200 may comprise first shell sections 202a and 202b, second shell sections 204a and 204b, third shell sections 206a and 206b, fourth shell sections 208a and 208b, and fifth shell sections 210a, 210b, and 210c. Core shroud 200 may be supported by shroud supports 212a, 212b, and 212c, as well as shroud support plate 214.

Shroud supports 212a, 212b, and 212c may be joined together using vertical seam welds V12, V13, and V14, and also may be joined using horizontal seam weld H8 to shroud support plate 214.

Fifth shell sections 210a, 210b, and 210c may be joined together using vertical seam welds V9, V10, and V11 to form a lower shell section of core shroud 200, and also may be joined using horizontal seam weld H7 to shroud supports 212a, 212b, and 212c.

Fourth shell sections 208a and 208b may be joined together using vertical seam welds V7 and V8 to form a bottom mid-core shell section of core shroud 200, and also may be joined using horizontal seam welds H6A and H6B to fifth shell sections 210a, 210b, and 210c. Horizontal seam weld H6A may represent the joining of fourth shell sections 208a and 208b to core plate support ring 216; horizontal seam weld H6B may represent the joining of core plate support ring 216 to fifth shell sections 210a, 210b, and 210c.

Third shell sections 206a and 206b may be joined together using vertical seam welds V5 and V6 to form a middle mid-core shell section of core shroud 200, and also may be joined using horizontal seam weld H5 to fourth shell sections 208a and 208b.

Second shell sections 204a and 204b may be joined together using vertical seam welds V3 and V4 to form a top mid-core shell section of core shroud 200, and also may be joined using horizontal seam weld H4 to third shell sections 206a and 206b.

First shell sections 202a and 202b may be joined together using vertical seam welds V1 and V2 to form an upper shell section of core shroud 200, and also may be joined using horizontal seam welds H2 and H3 to second shell sections 204a and 204b. Horizontal seam weld H2 may represent the joining of first shell sections 202a and 202b to top guide support ring 218; horizontal seam weld H3 may represent the joining of top guide support ring 218 to second shell sections 204a and 204b.

Horizontal seam weld H1 may represent the joining of shroud flange 220 to first shell sections 202a and 202b.

As known to a PHOSITA, the relative offsets in vertical seam welds V1-V14 attempt to ensure that a crack in a single vertical seam weld cannot propagate over a significant distance (e.g., all the way from horizontal seam weld H1 to horizontal seam weld H8). However, horizontal seam weld H1-H8 do not have such an offset arrangement.

Although SCC, IGSCC, and IASCC have been studied, no "cure" has been found. As a result, cracks continue to initiate and propagate in components of nuclear reactors. Core shrouds may be particularly susceptible due to their extremely high neutron fluence as the nuclear reactor ages. For example, in core shroud 200, the active fuel in an associated core 102 may extend vertically from between horizontal seam welds H5 and H6A to about horizontal seam weld H2 or H3. Thus, horizontal seam welds H2, H3, H4, and H5, and vertical seam welds V3, V4, V5, V6, V7, and V8, all may be described as being subject to extremely high neutron fluence. In the event of SCC, IGSCC, or IASCC of the seam welds, core shroud 200 could be replaced. However, a more economically feasible approach might be to conduct weld repair or to structurally replace the horizontal seam welds, vertical seams welds, or both.

Such a weld repair may be done with the seam welds submerged, but this approach may be difficult from a technical point of view. Such a weld repair also may be done with the seam welds not submerged, but this approach may present other issues, such as significant radiation exposure and extension of the critical path during an outage.

As known to a PHOSITA, tie-rods have been proposed to structurally replace the horizontal seam welds as a group. Although tie-rods may provide significant support for the horizontal seam welds as a group, such tie-rods may not be as effective in structurally replace individual horizontal seam welds.

As also known to a PHOSITA, various devices have been proposed to structurally replace the vertical seam welds. Most of these devices involved full penetration of the structure that includes the vertical seam welds. Although such devices may be employed, full penetration of the structure that includes the vertical seam welds may introduce other problems, such as creating potential leakage paths, complicating installation procedures and reactor safety calculations, and establishing new periodic inspection requirements.

Thus, a need exists for apparatuses and methods that may provide the ability to structurally replace individual welds in nuclear reactor components subject to SCC, IGSCC, or IASCC. In the case of core shroud 200, this may include structurally replacing individual horizontal seam welds, individual vertical seams welds, or both. In particular, a need exists for apparatuses and methods that may provide the ability to structurally replace individual welds in nuclear reactor components subject to SCC, IGSCC, or IASCC without fully penetrating a structure that includes the individual welds.

Related art systems, methods, and/or filters for apparatuses and methods for structurally replacing cracked welds are discussed, for example, in U.S. Pat. No. 5,392,322 to Whitling et al. ("the '322 patent"); U.S. Pat. No. 5,521,951 to Charnley et al. ("the '951 patent"); U.S. Pat. No. 5,530,219 to Offer et al. ("the '219 patent"); U.S. Pat. No. 5,538,381 to Erbes ("the '381 patent"); U.S. Pat. No. 5,621,778 to Erbes ("the '778 patent"); U.S. Pat. No. 5,675,619 to Erbes et al. ("the '619 patent"); U.S. Pat. No. 5,712,887 to Thompson et al. ("the '887 patent"); U.S. Pat. No. 5,729,581 to Loock et al. ("Loock"); U.S. Pat. No. 5,737,379 to Erbes ("the '379 patent"); U.S. Pat. No. 5,742,653 to Erbes et al. ("the '653 patent"); U.S. Pat. No. 5,802,129 to Deaver et al. ("the '129 patent"); U.S. Pat. No. 5,803,686 to Erbes et al. ("the '686 patent"); U.S. Pat. No. 5,803,688 to Gleason et al. ("the '688 patent"); U.S. Pat. No. 6,067,338 to Erbes ("the '338 patent"); U.S. Pat. No. 6,138,353 to Weems et al. ("Weems I"); U.S. Pat. No. 6,343,107 B1 to Erbes et al. ("the '107 patent"); U.S. Pat. No. 6,345,927 B1 to Pao et al. ("the '927 patent"); U.S. Pat. No. 6,371,685 B1 to Weems et al. ("Weems II"); U.S. Pat. No. 6,464,424 B1 to Weems et al. ("Weems III"); and U.S. Pat. No. 7,649,970 B2 to Erbes ("the '970 patent"); and in U.S. Patent Publication No. 2003/0234541 A1 to Thompson et al. ("the '541 publication"); U.S. Patent Publication No. 2011/0101177 A1 to Suganuma et al. ("Suganuma I"); and U.S. Patent Publication No. 2012/0087456 A1 to Suganuma et al. ("Suganuma II").

The disclosures of the '107 patent, the '129 patent, the '219 patent, the '322 patent, the '338 patent, the '379 patent, the '381 patent, the '619 patent, the '653 patent, the '686 patent, the '688 patent, the '778 patent, the '887 patent, the '927 patent, the '951 patent, and the '970 patent are incorporated in this application by reference in their entirety. Similarly, the disclosures of the '541 publication are incorporated in this application by reference in its entirety.

SUMMARY

Example embodiments may provide apparatuses and methods for structurally replacing cracked welds. Example embodiments may provide apparatuses and methods for structurally replacing cracked welds of nuclear plants.

In some example embodiments, an apparatus configured to structurally replace a cracked weld in a nuclear plant may comprise: a first body portion that comprises a first gripping portion; a second body portion that comprises a second gripping portion; a wedge portion between the first and second body portions; and/or an adjustment portion. The first body portion may be configured to slidably engage the second body portion. The wedge portion may be configured to exert force on the slidably engaged first and second body portions. The adjustment portion may be configured to increase or decrease the force exerted by the wedge portion on the slidably engaged first and second body portions. When the adjustment portion increases the force exerted by the wedge portion on the slidably engaged first and second body portions, a distance between the first and second gripping portions may decrease.

In some example embodiments, the adjustment portion may be further configured to prevent the distance between the first and second gripping portions from increasing.

In some example embodiments, the apparatus may further comprise a retaining portion. The retaining portion may be configured to interact with the adjustment portion so as to prevent the distance between the first and second gripping portions from increasing.

In some example embodiments, an apparatus configured to structurally replace a cracked weld in a nuclear plant may comprise: a body that comprises a first end, a second end, and a portion between the first and second ends. The first end may comprise a first gripping portion. The second end may comprise a second gripping portion. When the body is in an unflexed state, the first gripping portion and the second gripping portion may be a first distance apart. When the body is in a flexed state, the first gripping portion and the second gripping portion may be a second distance apart. The second distance may be greater than the first distance.

In some example embodiments, when the body is in the unflexed state, the body may have a first shape. When the body is in the flexed state, the body has a second shape. The first shape may be more curved than the second shape.

In some example embodiments, when the body is in the flexed state, the first gripping portion may be configured to enter a first slot on a first side of the cracked weld in a structure that includes the cracked weld and the second gripping portion may be configured to enter a second slot on a second side of the cracked weld in the structure that includes the cracked weld. When the body is in the unflexed state, the first gripping portion may be configured to grip the first slot on the first side of the cracked weld in the structure that includes the cracked weld and the second gripping portion may be configured to grip the second slot on the second side of the cracked weld in the structure that includes the cracked weld.

In some example embodiments, an apparatus configured to structurally replace a cracked weld in a nuclear plant may comprise: a first body portion that comprises a first gripping portion; a second body portion that comprises a second gripping portion; and/or an adjustment portion. The first body portion may be configured to slidably engage the second body portion. The adjustment portion may be configured to exert force on the slidably engaged first and second body portions. The adjustment portion may be further configured to increase or decrease the force exerted on the slidably engaged first and second body portions. When the adjustment portion increases the force exerted on the slidably engaged first and second body portions, a distance between the first and second gripping portions may decrease.

In some example embodiments, the adjustment portion may be further configured to prevent the distance between the first and second gripping portions from increasing.

In some example embodiments, the apparatus may further comprise a retaining portion. The retaining portion may be configured to interact with the adjustment portion so as to prevent the distance between the first and second gripping portions from increasing.

In some example embodiments, a method for structurally replacing a cracked weld in a nuclear plant may comprise: obtaining an apparatus that comprises a first body portion comprising a first gripping portion, a second body portion comprising a second gripping portion, a wedge portion between the first and second body portions, and an adjustment portion, wherein the first body portion is configured to slidably engage the second body portion, wherein the wedge portion is configured to exert a first force on the slidably engaged first and second body portions, wherein the adjustment portion is configured to increase or decrease the first force exerted by the wedge portion on the slidably engaged first and second body portions, and wherein when the adjustment portion increases the first force exerted by the wedge portion on the slidably engaged first and second body portions, a distance between the first and second gripping portions decreases; forming slots on both sides of the cracked weld in a structure that includes the cracked weld, wherein the slots do not fully penetrate the structure; disposing the apparatus near a surface of the structure so that the first gripping portion is in a first slot on a first side of the cracked weld and the second gripping portion is in a second slot on a second side of the cracked weld; and/or using the adjustment portion to increase the first force exerted by the wedge portion on the slidably engaged first and second body portions so as to decrease the distance between the first and second gripping portions until the first gripping portion grips the first slot and the second gripping portion grips the second slot with a second force that structurally replaces the cracked weld.

In some example embodiments, the method may not comprise removing material from the cracked weld.

In some example embodiments, the method may not comprise removing material from a weld heat-affected zone around the cracked weld.

In some example embodiments, the slots may be formed outside of a weld heat-affected zone around the cracked weld.

In some example embodiments, a method for structurally replacing a cracked weld in a nuclear plant may comprise: forming slots on both sides of the cracked weld in a structure that includes the cracked weld, wherein the slots do not fully penetrate the structure; disposing a body near a surface of the structure, the body comprising a first end, a second end, and a portion between the first and second ends, wherein the first end comprises a first gripping portion, and wherein the second end comprises a second gripping portion; changing the body from an unflexed state in which the first gripping portion and the second gripping portion are a first distance apart to a flexed state in which the first gripping portion and the second gripping portion are a second distance apart, wherein the second distance is greater than the first distance; moving the body in the flexed state so that the first gripping portion is in a first slot on a first side of the cracked weld and the second gripping portion is in a second slot on a second side of the cracked weld; and/or changing the body from the flexed state to the unflexed state so that the first gripping portion grips the first slot and the second gripping portion grips the second slot with a force that structurally replaces the cracked weld.

In some example embodiments, the method may not comprise removing material from the cracked weld.

In some example embodiments, the method may not comprise removing material from a weld heat-affected zone around the cracked weld.

In some example embodiments, the slots may be formed outside of a weld heat-affected zone around the cracked weld.

In some example embodiments, a method for structurally replacing a cracked weld in a nuclear plant may comprise: obtaining an apparatus that comprises a first body portion comprising a first gripping portion, a second body portion comprising a second gripping portion, and an adjustment portion, wherein the first body portion is configured to slidably engage the second body portion, wherein the adjustment portion is configured to exert a first force on the slidably engaged first and second body portions, wherein the adjustment portion is further configured to increase or decrease the first force exerted on the slidably engaged first and second body portions, and wherein when the adjustment portion increases the first force exerted on the slidably engaged first and second body portions, a distance between the first and second gripping portions decreases; forming slots on both sides of the cracked weld in a structure that includes the cracked weld, wherein the slots do not fully penetrate the structure; disposing the apparatus near a surface of the structure so that the first gripping portion is in a first slot on a first side of the cracked weld and the second gripping portion is in a second slot on a second side of the cracked weld; and/or using the adjustment portion to increase the first force exerted on the slidably engaged first and second body portions so as to decrease the distance between the first and second gripping portions until the first gripping portion grips the first slot and the second gripping portion grips the second slot with a second force that structurally replaces the cracked weld.

In some example embodiments, the method may not comprise removing material from the cracked weld.

In some example embodiments, the method may not comprise removing material from a weld heat-affected zone around the cracked weld.

In some example embodiments, the slots may be formed outside of a weld heat-affected zone around the cracked weld.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 5A is a front-side, exploded, perspective view of an apparatus configured to structurally replace a cracked weld in a nuclear plant according to some example embodiments;

FIG. 5B is an outline view of the apparatus of FIG. 5A;

FIG. 5C is a front perspective view of an assembled apparatus configured to structurally replace a cracked weld in a nuclear plant according to some example embodiments;

FIG. 5E is a top view of the assembled apparatus of FIG. 5C;

FIG. 5F is a back perspective view of the assembled apparatus of FIG. 5C;

FIG. 5G is a front perspective outline view of an assembled apparatus configured to structurally replace a cracked weld in a nuclear plant according to some example embodiments;

FIG. 5H is a top view of the assembled apparatus of FIG. 5G, with a first gripping portion in a first slot and a second gripping portion in a second slot;

FIG. 5J is another cross-sectional view of the assembled apparatus FIG. 5I taken along a centerline of the apparatus;

FIG. 5N is a view looking up at the two apparatuses of FIG. 5M;

FIG. 5O is a view looking up at the three apparatuses of FIG. 5K;

FIG. 6G is a front perspective view of an assembled apparatus configured to structurally replace a cracked weld in a nuclear plant according to some example embodiments;

FIG. 6H is a back perspective view of the assembled apparatus of FIG. 6G;

FIG. 6I is a front perspective view of the assembled apparatus of FIG. 6G, with a first gripping portion in a first slot and a second gripping portion in a second slot;

FIG. 7 is a flow chart illustrating a first method for structurally replacing a cracked weld in a nuclear plant according to some example embodiments;

DETAILED DESCRIPTION OF EXAMPLE EMBODIMENTS

Figure 1:
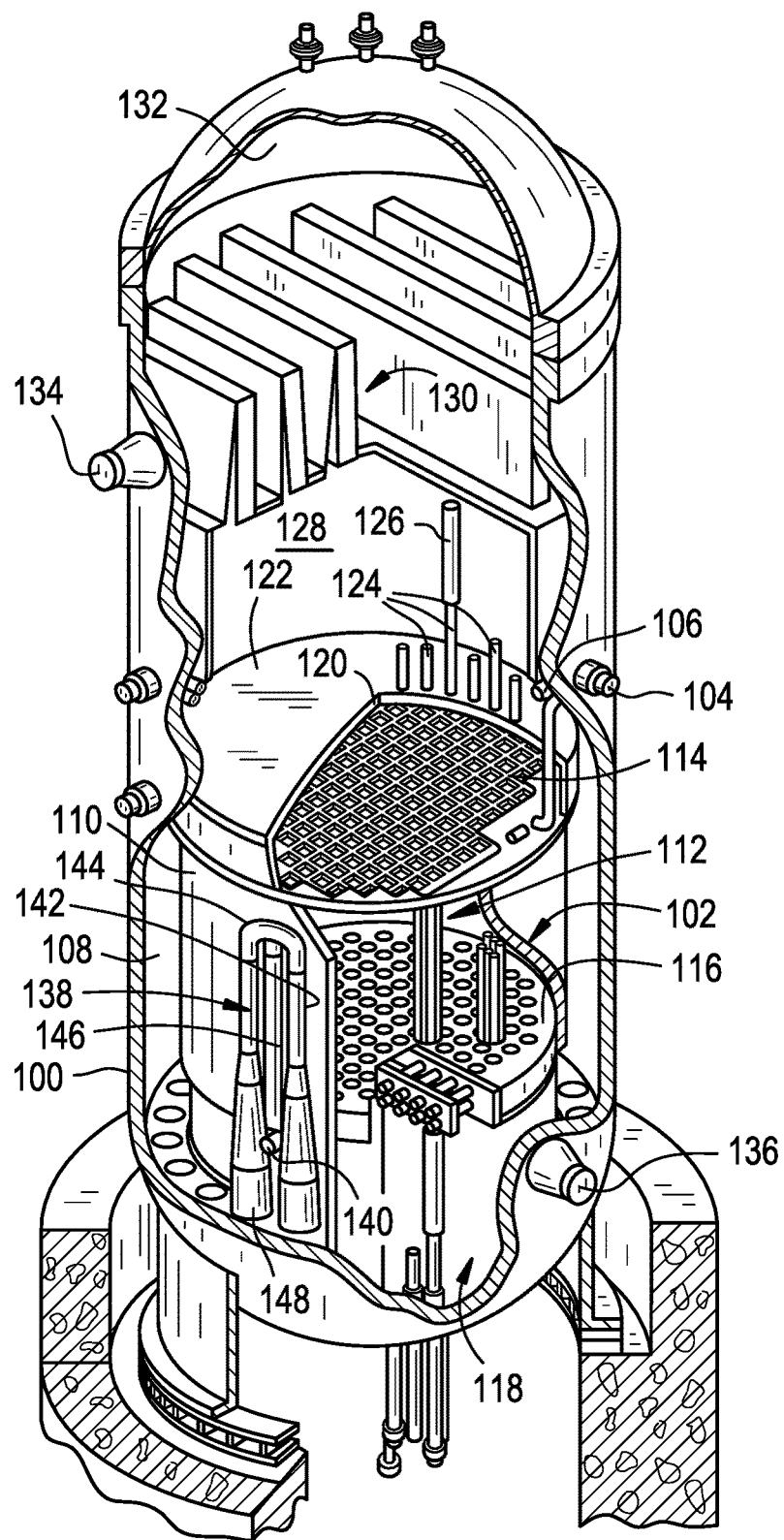
FIG. 1 is a sectional view, with parts cut away, of an RPV in a related art BWR.
Figure 2:
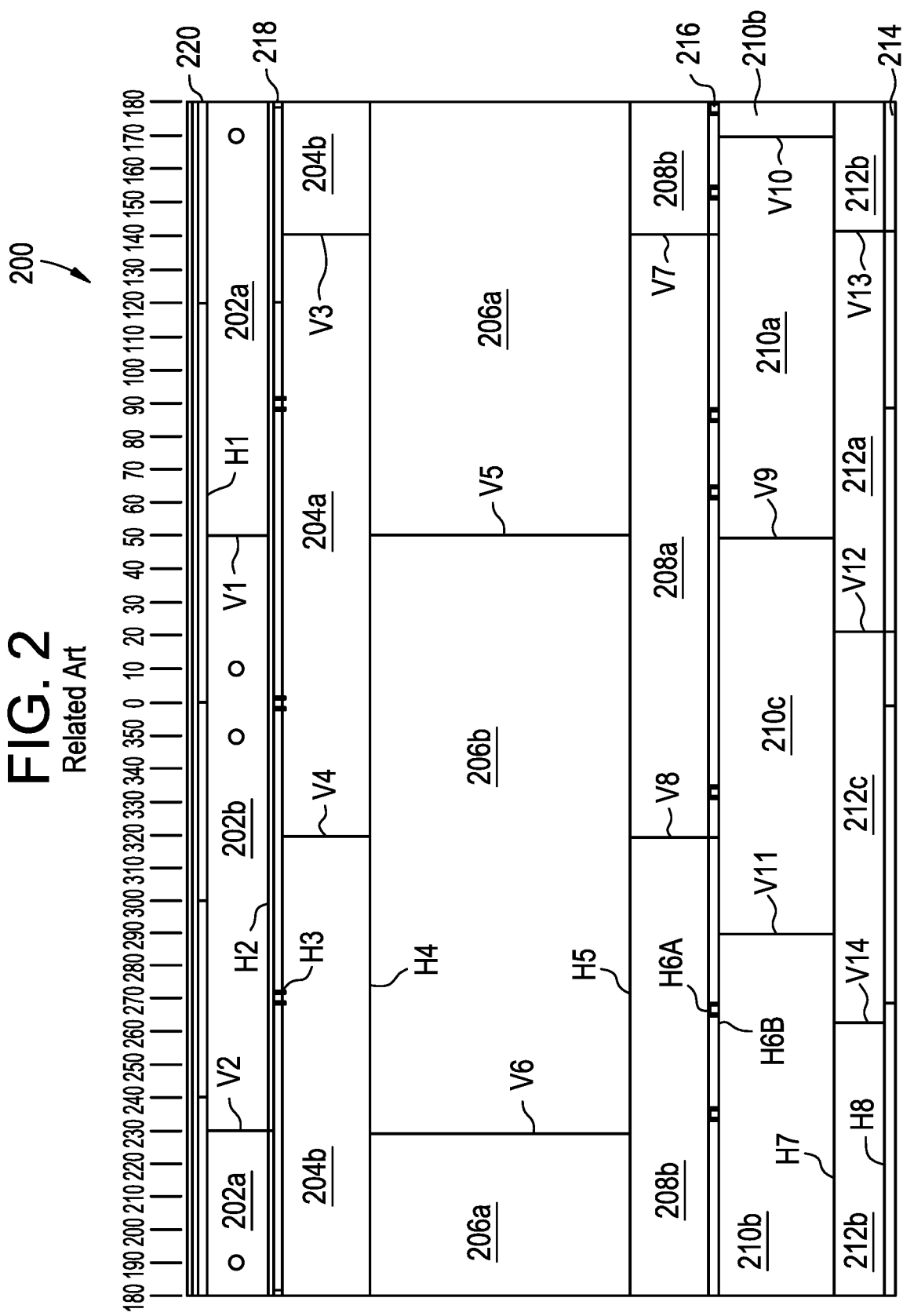
FIG. 2 is a schematic diagram showing a developed azimuthal view of the interior of a related BWR core shroud that comprises a plurality of shell sections, having vertical seam welds, that are welded together, one upon the next, by horizontal seam welds.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "irradiation relaxation" means stress relaxation of corresponding metals due to exposure to ionizing radiation, particularly neutron fluence in a nuclear plant.

The term "structurally replace" means to assume all mechanical loads for which the original load-bearing member was responsible.

The term "thermal tightening" means that a first body with a first coefficient of thermal expansion is outside of a second body with a second coefficient of thermal expansion, where the second coefficient of thermal expansion is higher. When the first and second bodies are heated, the second body expands more than the first body, causing the first body to constrain its movement, but from the frame of reference of the second body, the first body has tightened on the second body.

The term "weld heat-affected zone" means an area of metal that has had its microstructure and properties altered by welding.

Reference will now be made to example embodiments, which are illustrated in the accompanying drawings, wherein like reference numerals may refer to like components throughout.

Figure 3A:
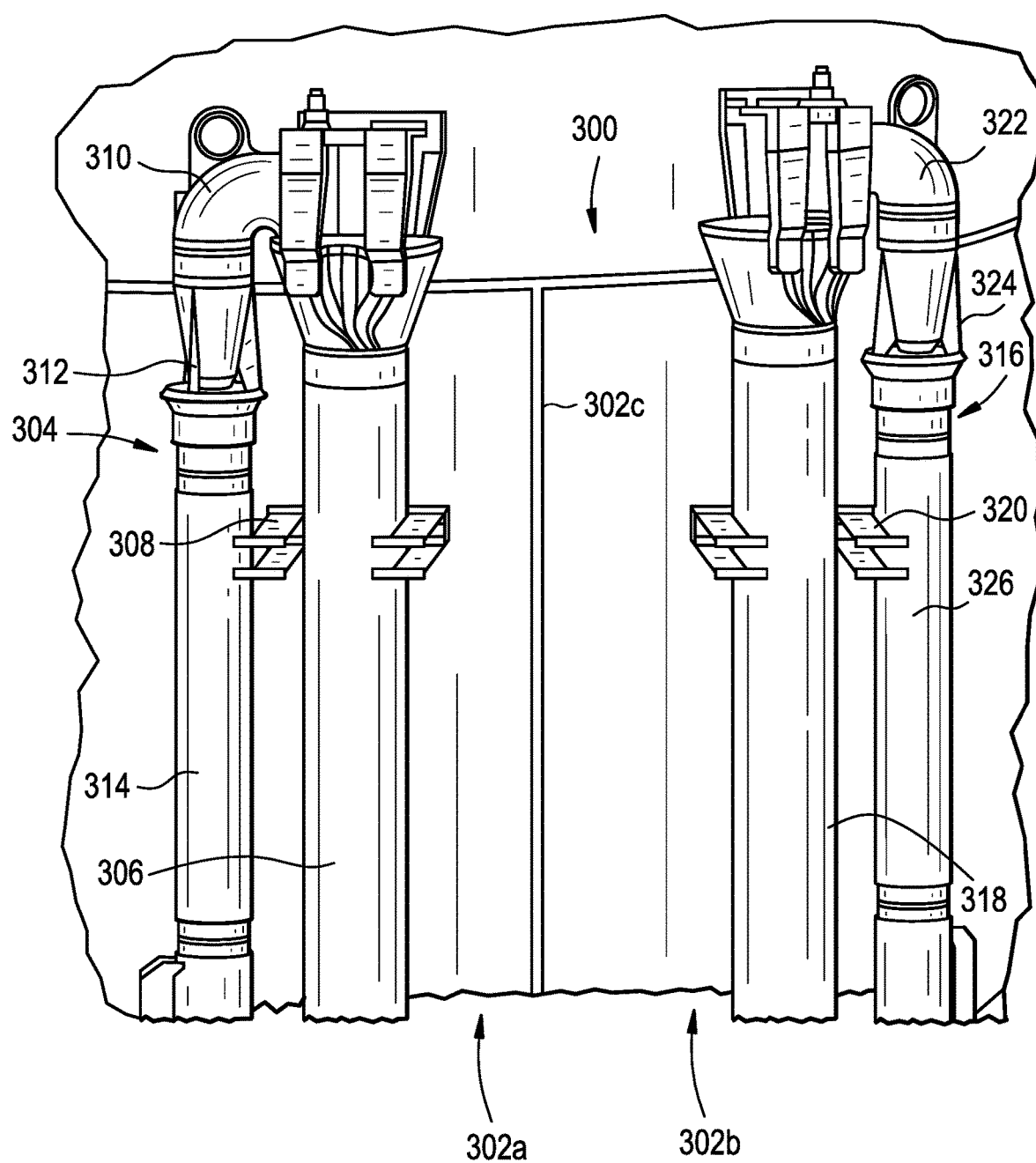
FIG. 3A is a diagram of a core shroud prior to preparation of outer surfaces of the core shroud near a weld according to some example embodiments.
Figure 3B:
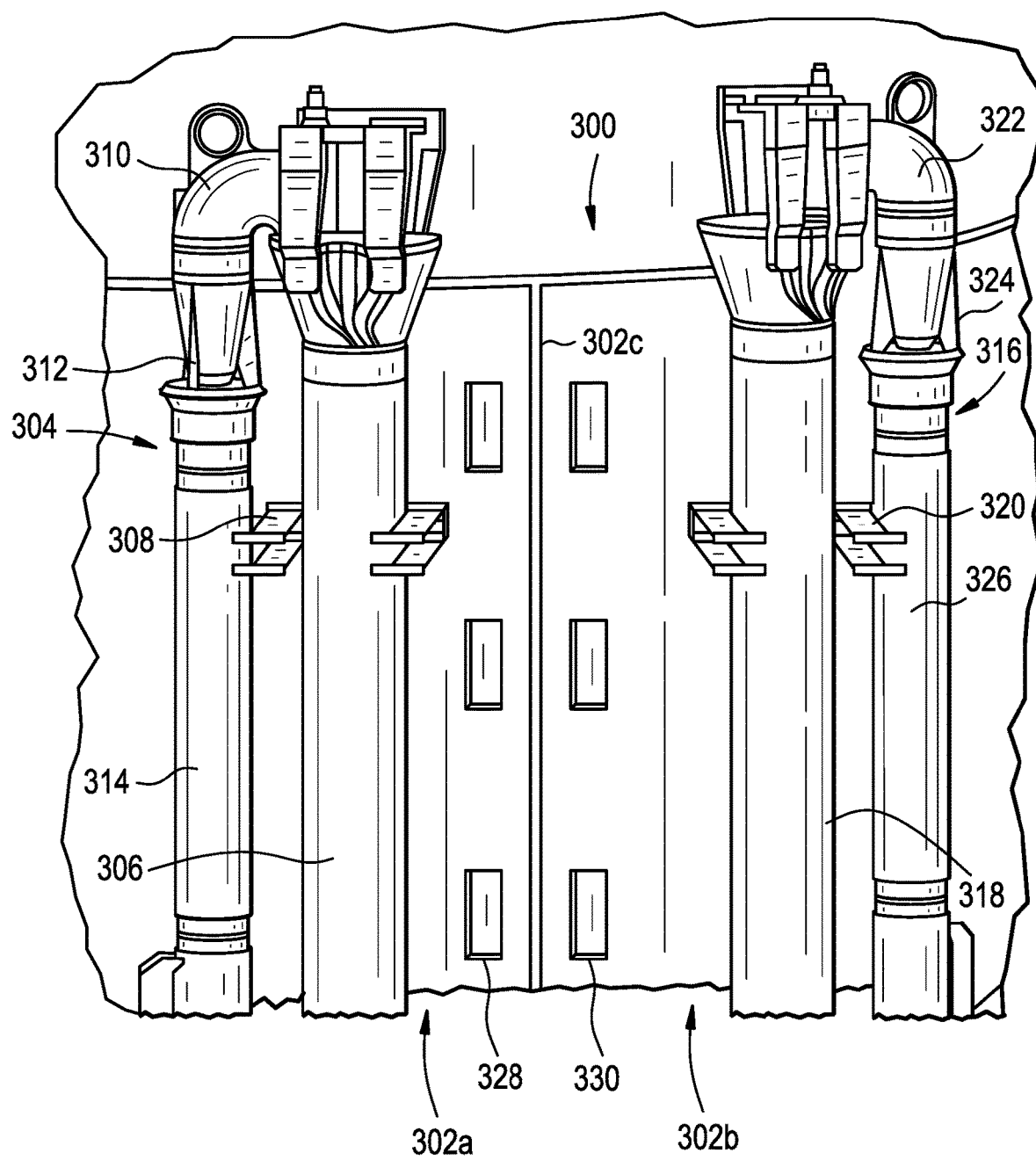
FIG. 3B is a diagram of a core shroud after preparation of outer surfaces of the core shroud near a weld according to some example embodiments.

FIG. 3A is a diagram of core shroud 300 prior to preparation of outer surfaces 302a and 302b of core shroud 300 near weld 302c according to some example embodiments. FIG. 3B is a diagram of core shroud 300 after preparation of outer surfaces 302a and 302b of core shroud 300 near weld 302c according to some example embodiments.

FIG. 3A shows jet pump assembly 304, including inlet riser 306, riser brace 308, left-hand transition piece 310, left-hand secondary inlet openings 312, and left-hand inlet mixer 314. The corresponding right-hand transition piece, right-hand secondary inlet openings, and right-hand inlet mixer of jet pump assembly 304 may be removed to facilitate access to outer surfaces 302a and 302b of core shroud 300 near weld 302c. Although tie-rods associated with core shroud 300 may be removed to facilitate access to outer surface 302a of core shroud 300 near weld 302c, the apparatuses and methods of the present application may allow the tie-rods to remain in place. FIG. 3A also shows jet pump assembly 316, including inlet riser 318, riser brace 320, right-hand transition piece 322, right-hand secondary inlet openings 324, and right-hand inlet mixer 326. The corresponding left-hand transition piece, left-hand secondary inlet openings, and left-hand inlet mixer of jet pump assembly 304 may be removed to facilitate access to outer surfaces 302a and 302b of core shroud 300 near weld 302c. Although tie-rods associated with core shroud 300 may be removed to facilitate access to outer surface 302b of core shroud 300 near weld 302c, the apparatuses and methods of the present application may allow the tie-rods to remain in place.

Similar to FIG. 3A, FIG. 3B shows jet pump assembly 304, including inlet riser 306, riser brace 308, left-hand transition piece 310, left-hand secondary inlet openings 312, and left-hand inlet mixer 314. The corresponding right-hand transition piece, right-hand secondary inlet openings, and right-hand inlet mixer of jet pump assembly 304 may be removed to facilitate access to outer surfaces 302a and 302b of core shroud 300 near weld 302c. Although tie-rods associated with core shroud 300 may be removed to facilitate access to outer surface 302a of core shroud 300 near weld 302c, the apparatuses and methods of the present application may allow the tie-rods to remain in place. Similar to FIG. 3A, FIG. 3B also shows jet pump assembly 316, including inlet riser 318, riser brace 320, right-hand transition piece 322, right-hand secondary inlet openings 324, and right-hand inlet mixer 326. The corresponding left-hand transition piece, left-hand secondary inlet openings, and left-hand inlet mixer of jet pump assembly 304 may be removed to facilitate access to outer surfaces 302a and 302b of core shroud 300 near weld 302c. Although tie-rods associated with core shroud 300 may be removed to facilitate access to outer surface 302b of core shroud 300 near weld 302c, the apparatuses and methods of the present application may allow the tie-rods to remain in place.

In addition, FIG. 3B shows an example of preparation work on outer surfaces 302a and 302b of core shroud 300 near weld 302c. One or more slots 328 may be formed in outer surface 302a of core shroud 300 near weld 302c. Similarly, one or more slots 330 may be formed in outer surface 302b of core shroud 300 near weld 302c.

Figure 3C:
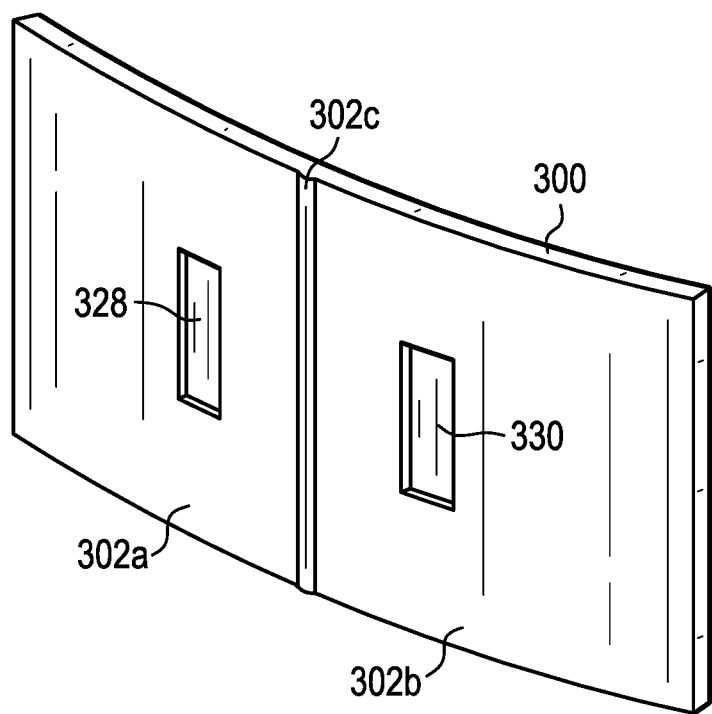
FIG. 3C is a perspective view of a core shroud, outer surfaces, a weld, and slots according to some example embodiments.
Figure 3D:
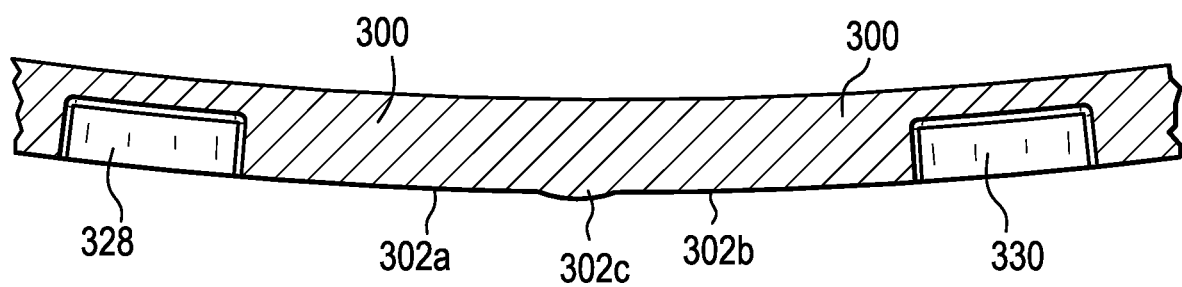
FIG. 3D is a top view of a core shroud, outer surfaces, a weld, and slots according to some example embodiments.

FIG. 3C is a perspective view of core shroud 300, outer surfaces 302a and 302b, weld 302c, a slot 328, and a slot 330 according to some example embodiments. FIG. 3D is a top view of core shroud 300, outer surfaces 302a and 302b, weld 302c, a slot 328, and a slot 330 according to some example embodiments.

As shown in FIGS. 3C and 3D, one or more slots 328 and one or more slots 330 may not fully penetrate the structure core shroud 300 in order to avoid the potentially negative effects associated with such full penetrations. A thickness of core shroud 300 may be, for example, between about 1.5 inches and about 2.0 inches. A depth of one or more slots 328 and one or more slots 330 may be, for example, up to 90% of the thickness of core shroud 300. The depth of one or more slots 328 and one or more slots 330 may be, for example, greater than or equal to 50% of the thickness of core shroud 300 and less than or equal to 70% of the thickness of core shroud 300.

One or more slots 328 and one or more slots 330 may be formed using techniques known to a PHOSITA, such as Electrical Discharge Machining ("EDM"). In some example embodiments, performance of the apparatuses and methods of the present application may be improved by improving the quality and precision (e.g., positional accuracy and proper orientation) of such forming techniques.

As shown in FIGS. 3B-3D, each slot 328 may correspond to a slot 330, and each slot 330 may correspond to a slot 328. Although not limited to a specific shape, a volume associated with one or more slots 328 may approximate that of a rectangular solid. Similarly, although not confined to a specific shape, a volume associated with one or more slots 330 may approximate that of a rectangular solid. A size of the rectangular solid might be, for example, about 3 inches wide, about 7 inches tall, and about 1 inch deep. Because of scalability, however, one or more of these dimensions could be bigger or smaller than those values. Additionally, as discussed above, one or more slots 328 and one or more slots 330 are not limited to a specific shape.

An edge of one or more slots 328 closer to weld 302c may be substantially parallel to weld 302c. Similarly, an edge of one or more slots 330 closer to weld 302c may be substantially parallel to weld 302c.

An edge of one or more slots 328 closer to weld 302c may be substantially parallel to an edge of one or more slots 330 closer to weld 302c. One or more slots 328 may be substantially parallel to one or more slots 330. A distance from weld 302c to one or more slots 328 or one or more slots 330 may be, for example, greater than or equal to about 3 inches and less than or equal to about 5 inches.

An edge of one or more slots 328 closer to weld 302c may be substantially perpendicular to outer surface 302a. An edge of one or more slots 328 closer to weld 302c may be undercut so that at least one portion of one or more slots 328 not at outer surface 302a is closer to weld 302c than the edge of one or more slots 328 at outer surface 302a. In some example embodiments, performance of the apparatuses and methods of the present application may be improved by such undercuts.

One or more slots 328 may lie at an angle relative to one or more slots 330 (e.g., forming a dovetail relationship). The angle may be, for example, greater than or equal to about 5° and less than or equal to about 20°. The angle may be, for example, about 10°. This angular relationship may result from EDM techniques. This angular relationship also may result, for example, from curvature of outer surfaces 302a and 302b of core shroud 300 near weld 302c. Additionally, this angular relationship may result, for example, from a radial orientation of EDM relative to a curved or cylindrical surface. In some example embodiments, performance of the apparatuses and methods of the present application may be improved this angular relationship.

Figure 4A:
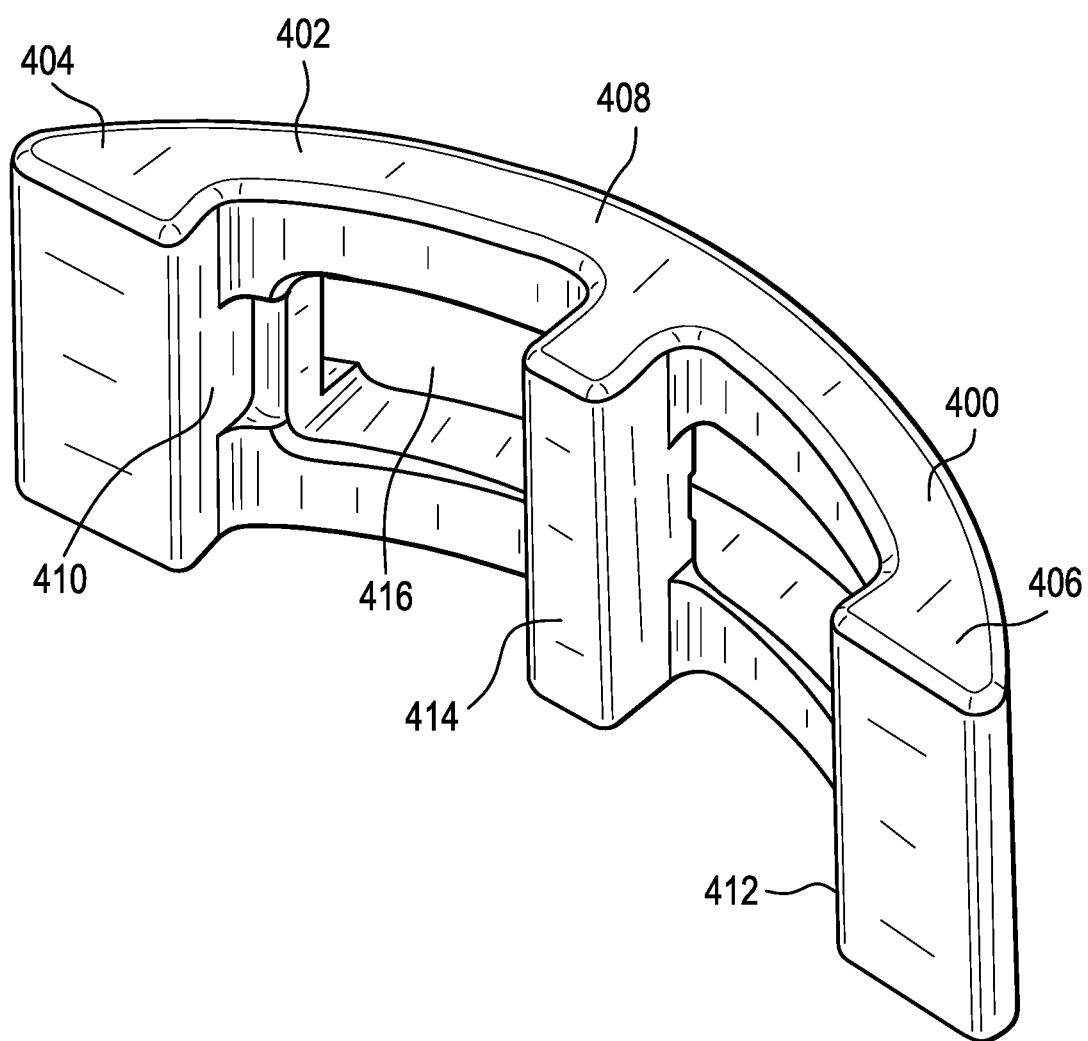
FIG. 4A is a front-side perspective view of an apparatus configured to structurally replace a cracked weld in a nuclear plant according to some example embodiments.
Figure 4B:
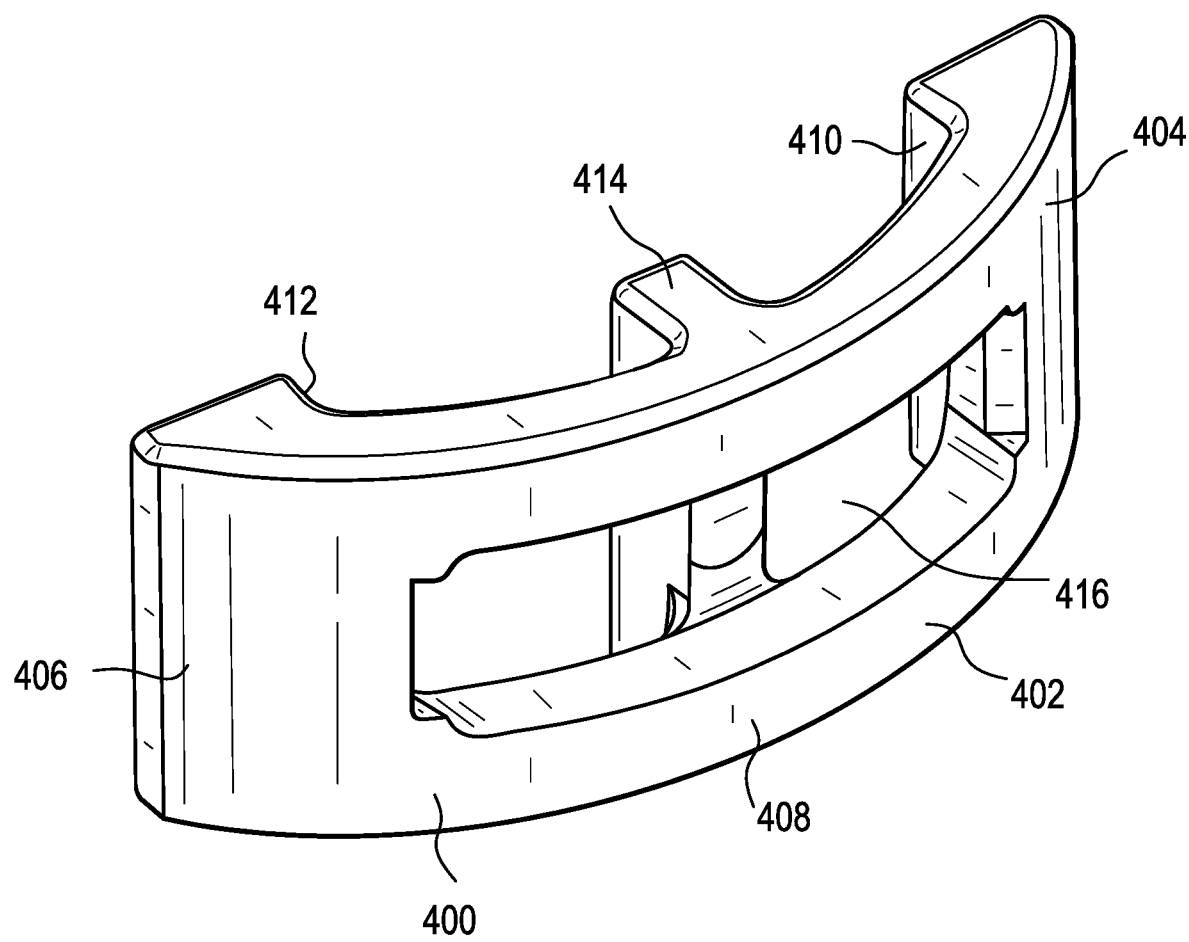
FIG. 4B is a back-side perspective view of an apparatus configured to structurally replace a cracked weld in a nuclear plant according to some example embodiments.

FIG. 4A is a front-side perspective view of apparatus 400 configured to structurally replace a cracked weld in a nuclear plant according to some example embodiments; FIG. 4B is a back-side perspective view of apparatus 400 according to some example embodiments.

Apparatus 400 may comprise body 402. Body 402 may be configured to act as a spring clamp.

Body 402 may comprise metal. The metal may have a coefficient of thermal expansion that is less than a coefficient of thermal expansion associated with the material of core shroud 300. Thus, when the nuclear plant is heated up, for example, to normal operating temperature, this difference in coefficients of thermal expansion may result in thermal tightening of body 402 with respect to core shroud 300. The metal may be, for example, XM-19 stainless steel, a 600-series Inconel (e.g., 600, 617, 625, or 690), a 700-series Inconel (e.g., 718 or X-750), or equivalent.

Body 402 may comprise first end 404, second end 406, and portion 408 between first end 404 and second end 406. First end 404 may comprise first gripping portion 410. Second end 406 may comprise second gripping portion 412. Portion 408 may comprise section 414 configured to assist an operator in changing body 402 from an unflexed state to a flexed state or from a flexed state to an unflexed state.

Body 402 may further comprise access 416 configured to allow a tool (not shown) to engage body 402 in order to assist an operator in changing body 402 from an unflexed state to a flexed state or from a flexed state to an unflexed state.

Figure 4C:
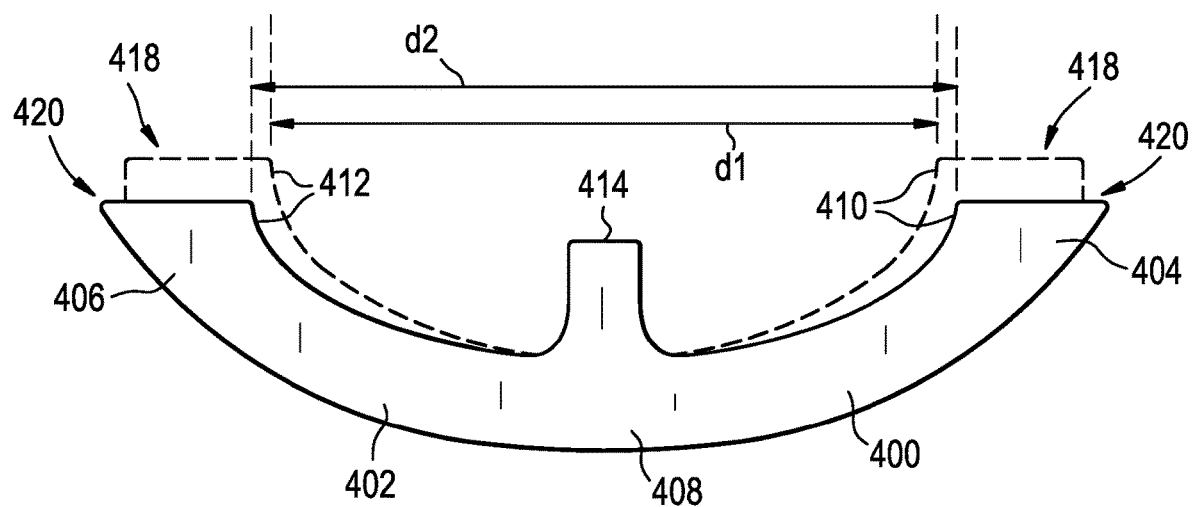
FIG. 4C is a top view of a body in an unflexed state and in a flexed state according to some example embodiments.

FIG. 4C is a top view of body 402 in unflexed state 418 and in flexed state 420 according to some example embodiments. When body 402 is in unflexed state 418, first gripping portion 410 and second gripping portion 412 may be a first distance d1 apart. When body 402 is in flexed state 420, first gripping portion 410 and second gripping portion 412 may be a second distance d2 apart. Second distance d2 may be greater than first distance d1.

When body 402 is in unflexed state 418, body 402 may have a first shape. When body 402 is in flexed state 420, body 402 may have a second shape. The first shape may be more curved than the second shape.

When body 402 is in flexed state 420, first gripping portion 410 may be configured to enter slot 328 formed in outer surface 302a of core shroud 300 near weld 302c (e.g., a cracked weld) and second gripping portion 412 may be configured to enter slot 330 formed in outer surface 302b of core shroud 300 near weld 302c. When body 402 is in unflexed state 418, first gripping portion 410 may be configured to grip slot 328 and second gripping portion 412 may be configured to grip slot 330, compressing weld 302c.

Figure 4D:
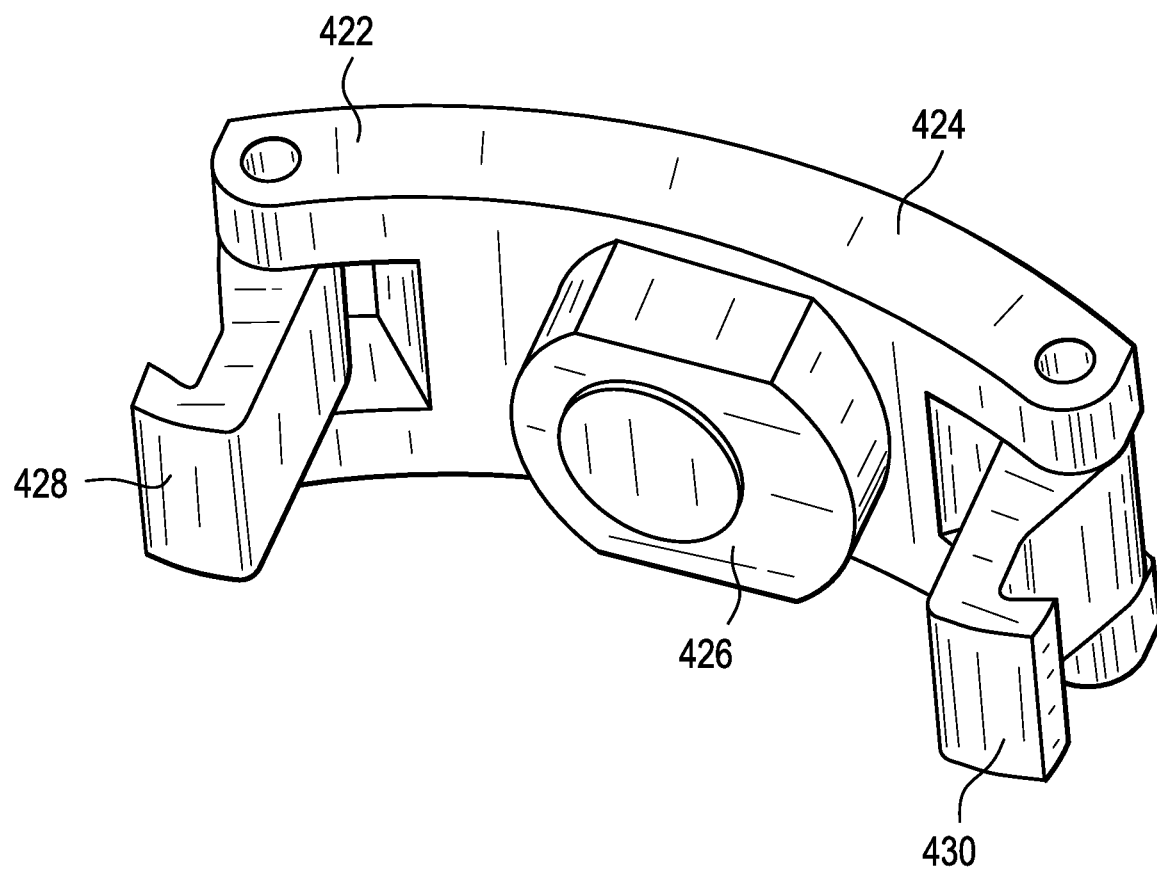
FIG. 4D is a front-side perspective view of a tool configured to assist an operator in changing a body from an unflexed state to a flexed state or from the flexed state to the unflexed state according to some example embodiments.
Figure 4E:
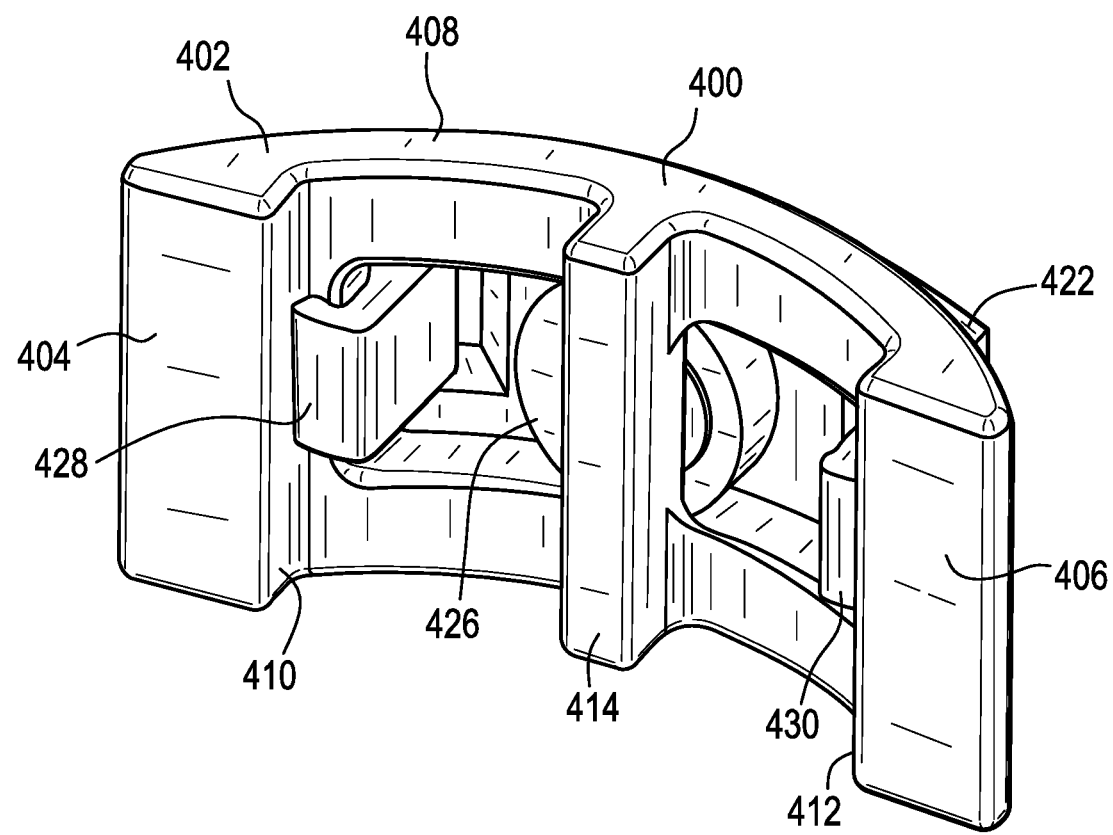
FIG. 4E is a front-side perspective view of a tool mated with an apparatus configured to structurally replace a cracked weld in a nuclear plant according to some example embodiments.
Figure 4F:
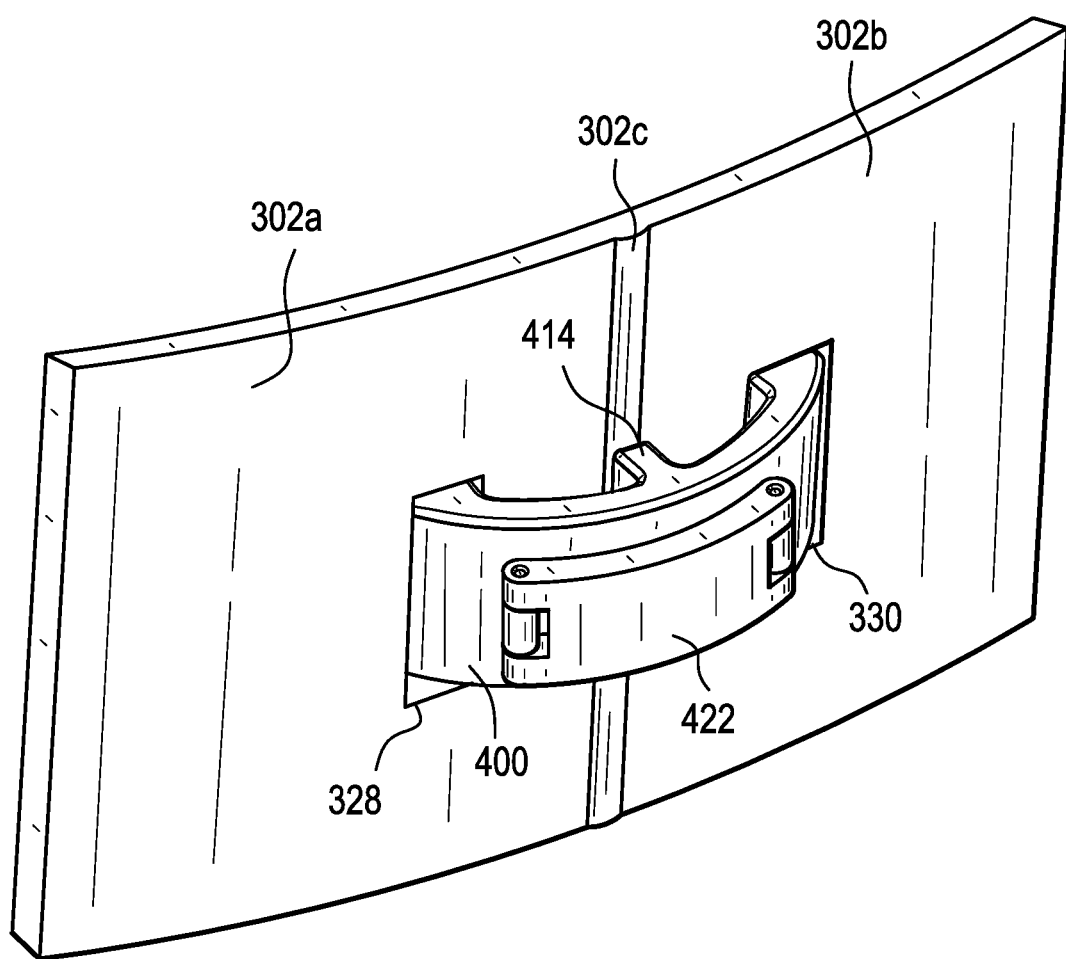
FIG. 4F is a back-side perspective view of a tool mated with an apparatus configured to structurally replace a cracked weld in a nuclear plant, a first gripping portion in a first slot, and a second gripping portion in a second slot according to some example embodiments.
Figure 4G:
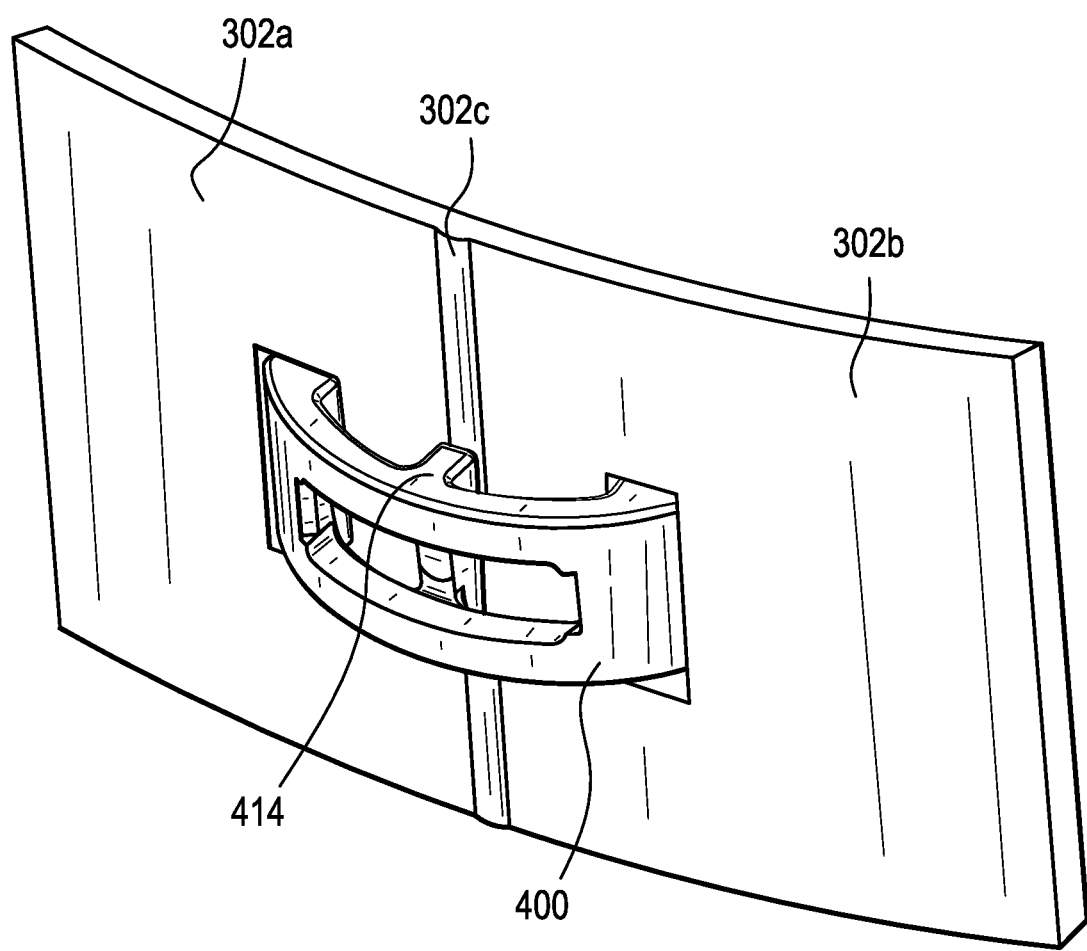
FIG. 4G is a back-side perspective view of an apparatus configured to structurally replace a cracked weld in a nuclear plant, after withdrawal a tool configured to assist an operator in changing a body from an unflexed state to a flexed state or from the flexed state to the unflexed state, according to some example embodiments.

FIG. 4D is a front-side perspective view of tool 422 configured to assist an operator in changing body 402 from unflexed state 418 to flexed state 420 or from flexed state 420 to an unflexed state 418 according to some example embodiments; FIG. 4E is a front-side perspective view of tool 422 mated with apparatus 400 according to some example embodiments; FIG. 4F is a back-side perspective view of tool 422 mated with apparatus 400, first gripping portion 410 in slot 328, and second gripping portion 412 in slot 330 according to some example embodiments (in FIG. 4F, section 414 may or may not be in contact with weld 302c); and FIG. 4G is a back-side perspective view of apparatus 400, first gripping portion 410 in slot 328, and second gripping portion 412 in slot 330, after withdrawal of tool 422, according to some example embodiments (in FIG. 4G, section 414 may or may not be in contact with weld 302c).

Tool 422 may include main body 424, actuator 426, first arm 428, and second arm 430. Tool 422 may be configured to mate with apparatus 400 using access 416. Actuator 426 (e.g., a hydraulic actuator using, for example, demineralized water) may use first arm 428 to engage first end 404 and second arm 430 to engage second end 406. Application of hydraulic power to actuator 426 may then cause first arm 428 and second arm 430 to change body 402 from unflexed state 418 to flexed state 420. Pressing of section 414 against core shroud 300 may increase mechanical advantage available in changing body 402 from unflexed state 418 to flexed state 420.

As would be understood by a PHOSITA, tool 422 may be remotely operated by industry-standard equipment (e.g., attached to a handling pole used by an operator from a servicing platform). As also would be understood by a PHOSITA, tool 422 may be hydraulically powered by industry-standard equipment. Additionally, as would be understood by a PHOSITA, tool 422 should not flex apparatus 400 beyond the yield strength of the material of apparatus 400.

Figure 4H:
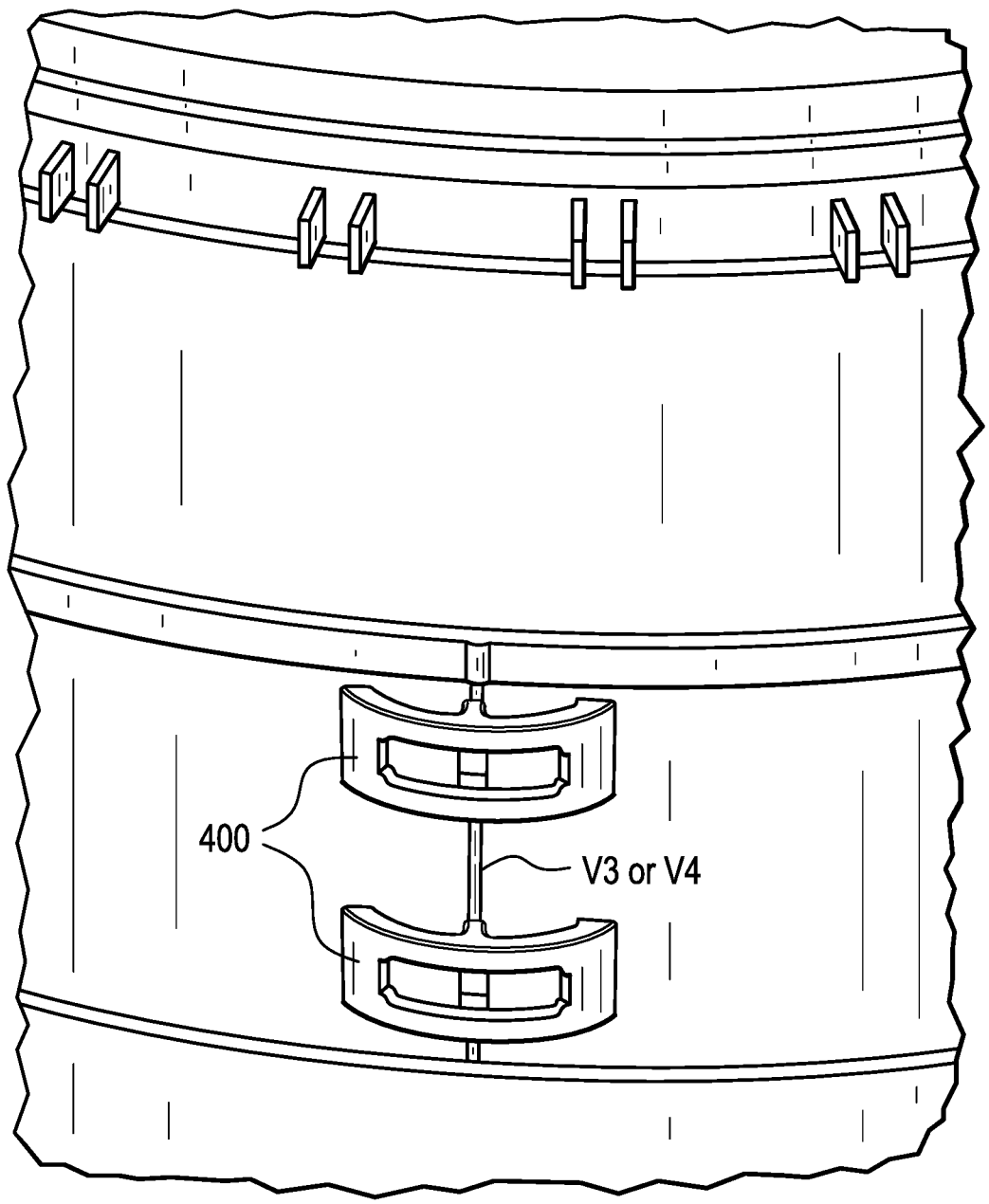
FIG. 4H is a front view of two apparatuses configured to structurally replace a cracked weld in a nuclear plant, at vertical seam weld V3 or V4 according to some example embodiments.
Figure 4I:
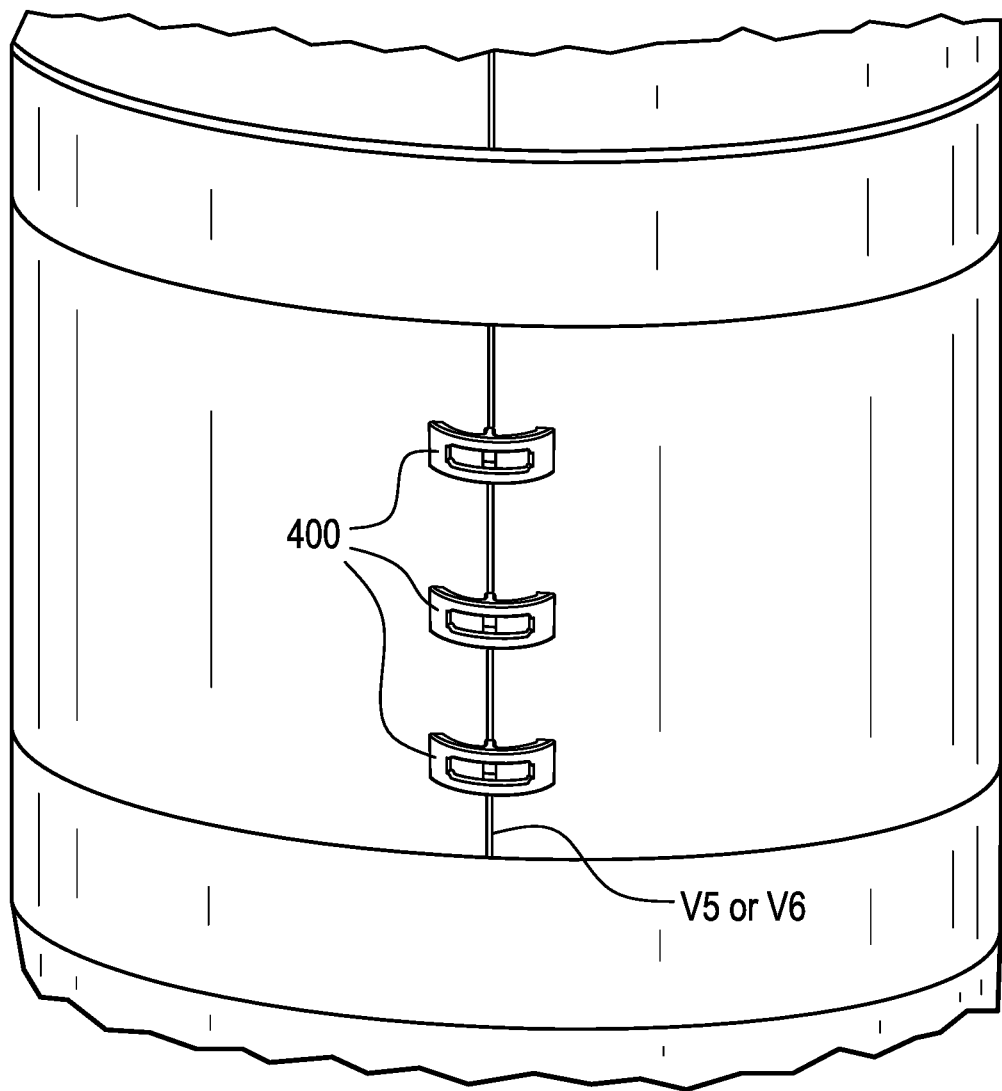
FIG. 4I is a front view of three apparatuses configured to structurally replace a cracked weld in a nuclear plant, at vertical seam weld V5 or V6 according to some example embodiments.

FIG. 4H is a front view of two apparatuses 400, configured to structurally replace a cracked weld in a nuclear plant, at vertical seam weld V3 or V4 according to some example embodiments; FIG. 4I is a front view of three apparatuses 400, configured to structurally replace a cracked weld in a nuclear plant, at vertical seam weld V5 or V6 according to some example embodiments.

According to some example embodiments, apparatuses 400 may be scalable in size and the amount of force applied. Thus, there may be trade-offs between the size of the apparatuses 400 used and the number of apparatuses 400 used (e.g., fewer bigger apparatuses 400 versus more numerous smaller apparatuses 400). As would be understood by a PHOSITA, many factors may play into such a decision, such as length of outage, critical path considerations, physical limitations on access to weld 302*c*, etc.

According to some example embodiments, apparatuses 400 may be easily installed, removed, replaced, or inspected. According to some example embodiments, apparatuses 400 may be of single-piece construction.

According to some example embodiments, apparatuses 400 may be pre-loaded so as to prevent damage due to vibration, taking into consideration factors such as irradiation relaxation and thermal tightening. According to some example embodiments, apparatuses 400 may be pre-loaded to account for hoop stresses, such as normal, upset, and loss of coolant accident ("LOCA") hoop stresses. According to some example embodiments, apparatuses 400 may be pre-loaded to account for pressure differences across core shroud 300, such as normal, upset, and LOCA differential pressures.

FIG. 5A is a front-side, exploded, perspective view of apparatus 500 configured to structurally replace a cracked weld in a nuclear plant according to some example embodiments; FIG. 5B is an outline view of apparatus 500 of FIG. 5A.

Apparatus 500 may comprise first body portion 502, second body portion 504, and adjustment portion 506. Apparatus 500 may be pre-assembled prior to installation (e.g., on the refueling floor), simplifying that process. Apparatus 500 may be configured to act as a self-aligning clamp.

First body portion 502 may comprise first gripping portion 508. Second body portion 504 may comprise second gripping portion 510. First body portion 502 may be configured to slidably engage second body portion 504.

Adjustment portion 506 may be configured to exert force on the slidably engaged first body portion 502 and second body portion 504. Adjustment portion 506 may be further configured to increase or decrease the force exerted on force on the slidably engaged first body portion 502 and second body portion 504. When adjustment portion 506 increases the force exerted on force on the slidably engaged first body portion 502 and second body portion 504, a distance between first gripping portion 508 and second gripping portion 510 may decrease, compressing weld 302*c* (assuming that apparatus 500 is in use to structurally replace a cracked weld).

First gripping portion 508 may be configured to enter slot 328 formed in outer surface 302*a* of core shroud 300 near weld 302*c* (e.g., a cracked weld) and second gripping portion 510 may be configured to enter slot 330 formed in outer surface 302*b* of core shroud 300 near weld 302*c*. When adjustment portion 506 exerts force on the slidably engaged first body portion 502 and second body portion 504, first gripping portion 508 may be configured to grip slot 328 and second gripping portion 510 may be configured to grip slot 330, compressing weld 302*c*.

Adjustment portion 506 may be further configured to prevent the distance between first body portion 502 and second body portion 504 from increasing. Such a retention feature may include, for example, a detent mechanism, locking tab, pin, or ratchet mechanism.

Adjustment portion 506 may comprise stud 512 and nut 514. Stud 512 may comprise first end 516 and second end 518. First end 516 of stud 512 may be configured to fit into access 520 in first body portion 502. First end 516 of stud 512 may be further configured to interact with nut 514. For example, stud 512 may be threaded near first end 516 so as to mate with nut 514. Tightening nut 514 may draw first end 516 through nut 514, moving first gripping portion 508 and second gripping portion 510 closer together or, if first gripping portion 508 is already gripping slot 328 and second gripping portion 510 is already gripping slot 330, compressing weld 302*c*.

Access 520 may be configured to interact with nut 514 so as to allow the slidable engagement of first body portion 502 and second body portion 504 when first body portion 502 and second body portion 504 are not directly in line with one another. This self-aligning feature may include, for example, a ball and seat arrangement in which access 520 may provide a substantially spherical seat and nut 514 may provide a corresponding substantially spherical ball. This self-aligning feature may reduce dependency on the quality and precision of the forming techniques for one or more slots 328 and one or more slots 330.

Second end 518 of stud 512 may be configured to fit into access 522 in second body portion 504. When first body portion 502 and second body portion 504 are slidably engaged, second end 518 of stud 512 may interact with access 522 so as to prevent rotation of stud 512 relative to second body portion 504.

Apparatus 500 may further comprise retaining portion 516. Retaining portion 516 may be configured to interact with nut 514 so as to prevent the distance between first body portion 502 and second body portion 504 from increasing. Such a retention feature may include, for example, a detent mechanism, locking tab, pin, or ratchet mechanism.

Figure 5D:
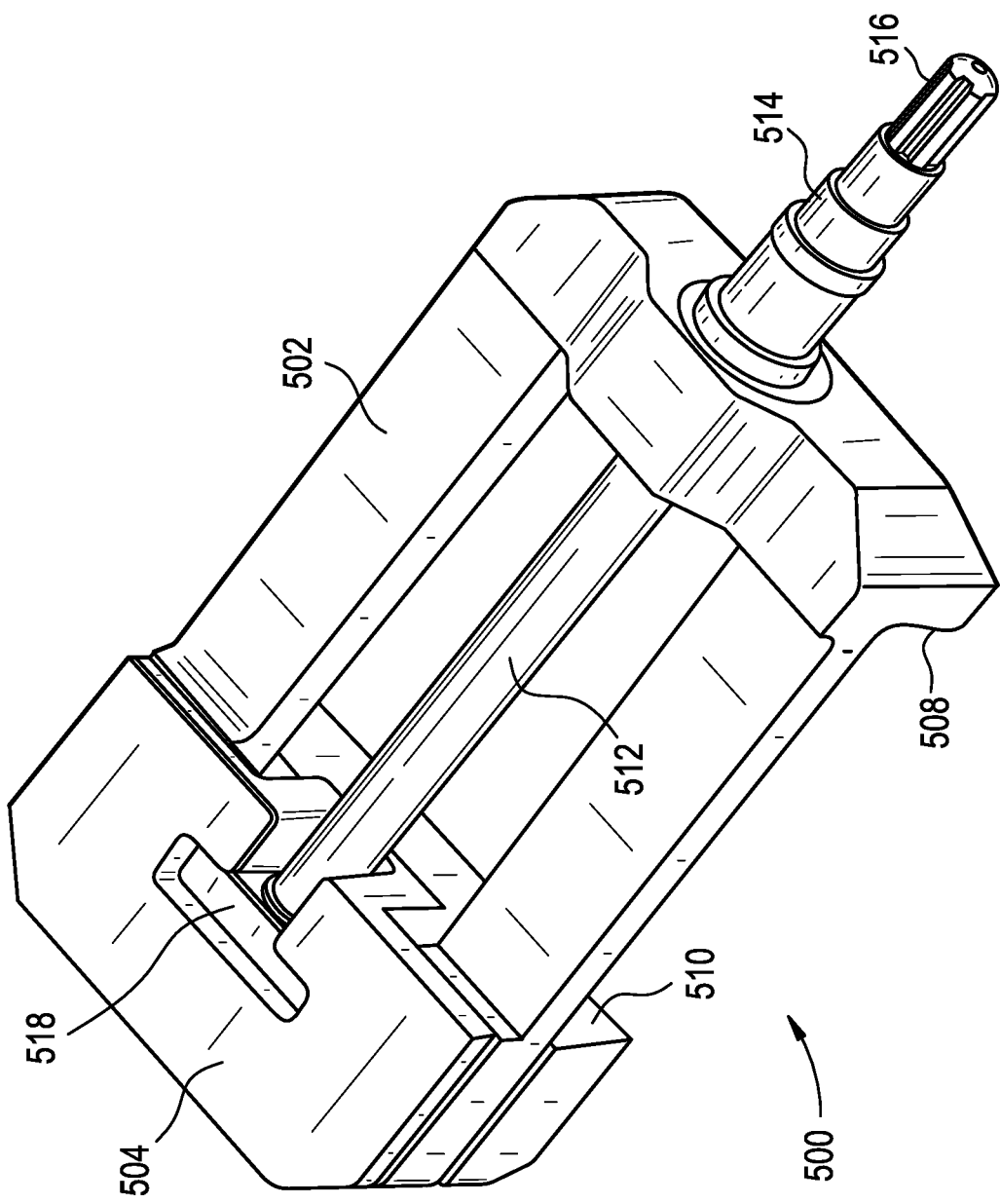
FIG. 5D is another front perspective view of the assembled apparatus of FIG. 5C.

FIG. 5C is a front perspective view of assembled apparatus 500 configured to structurally replace a cracked weld in a nuclear plant according to some example embodiments; FIG. 5D is another front perspective view of assembled apparatus 500 of FIG. 5C; FIG. 5E is a top view of assembled apparatus 500 of FIG. 5C; and FIG. 5F is a back perspective view of assembled apparatus 500 of FIG. 5C.

FIG. 5G is a front perspective outline view of assembled apparatus 500 configured to structurally replace a cracked weld in a nuclear plant according to some example embodiments; and FIG. 5H is a top view of assembled apparatus 500 of FIG. 5G, with first gripping portion 508 in slot 328 and second gripping portion 510 in slot 330.

Figure 5I:
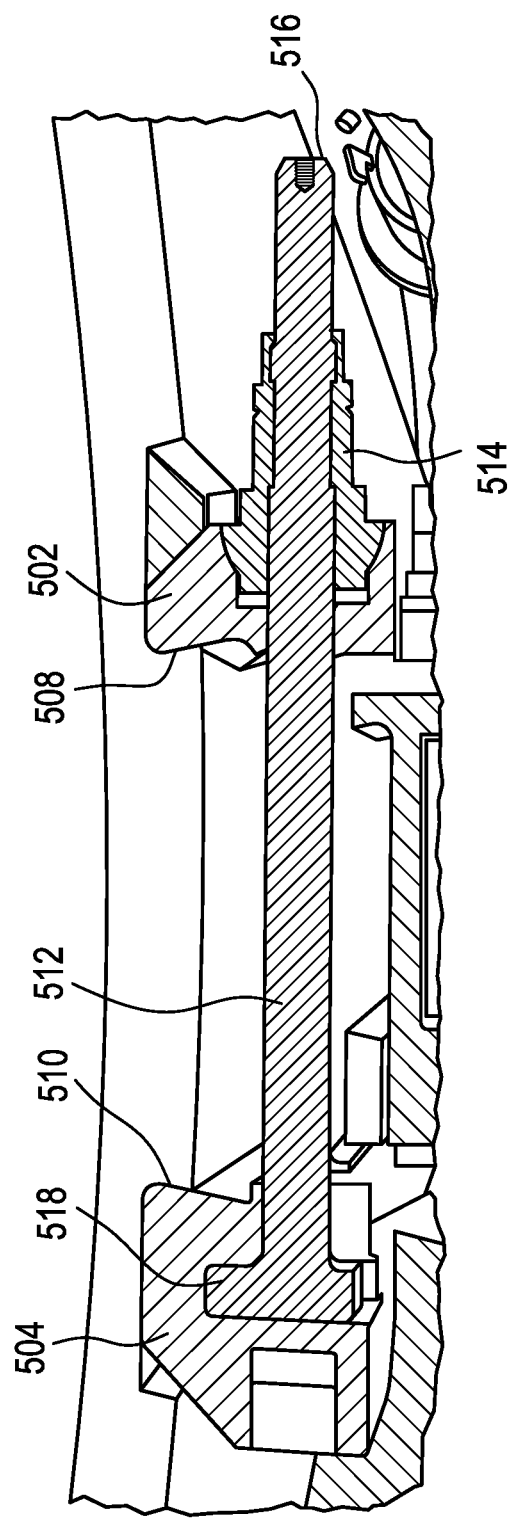
FIG. 5I is a cross-sectional view of an assembled apparatus configured to structurally replace a cracked weld in a nuclear plant, taken along a centerline of the apparatus, with a first gripping portion in a first slot and a second gripping portion in a second slot, according to some example embodiments.

FIG. 5I is a cross-sectional view of assembled apparatus 500 configured to structurally replace a cracked weld in a nuclear plant, taken along a centerline of apparatus 500, with first gripping portion 508 in slot 328 and second gripping portion 510 in slot 330, according to some example embodiments; and FIG. 5J is another cross-sectional view of assembled apparatus 500 of FIG. 5I taken along a centerline of apparatus 500.

Figure 5K:
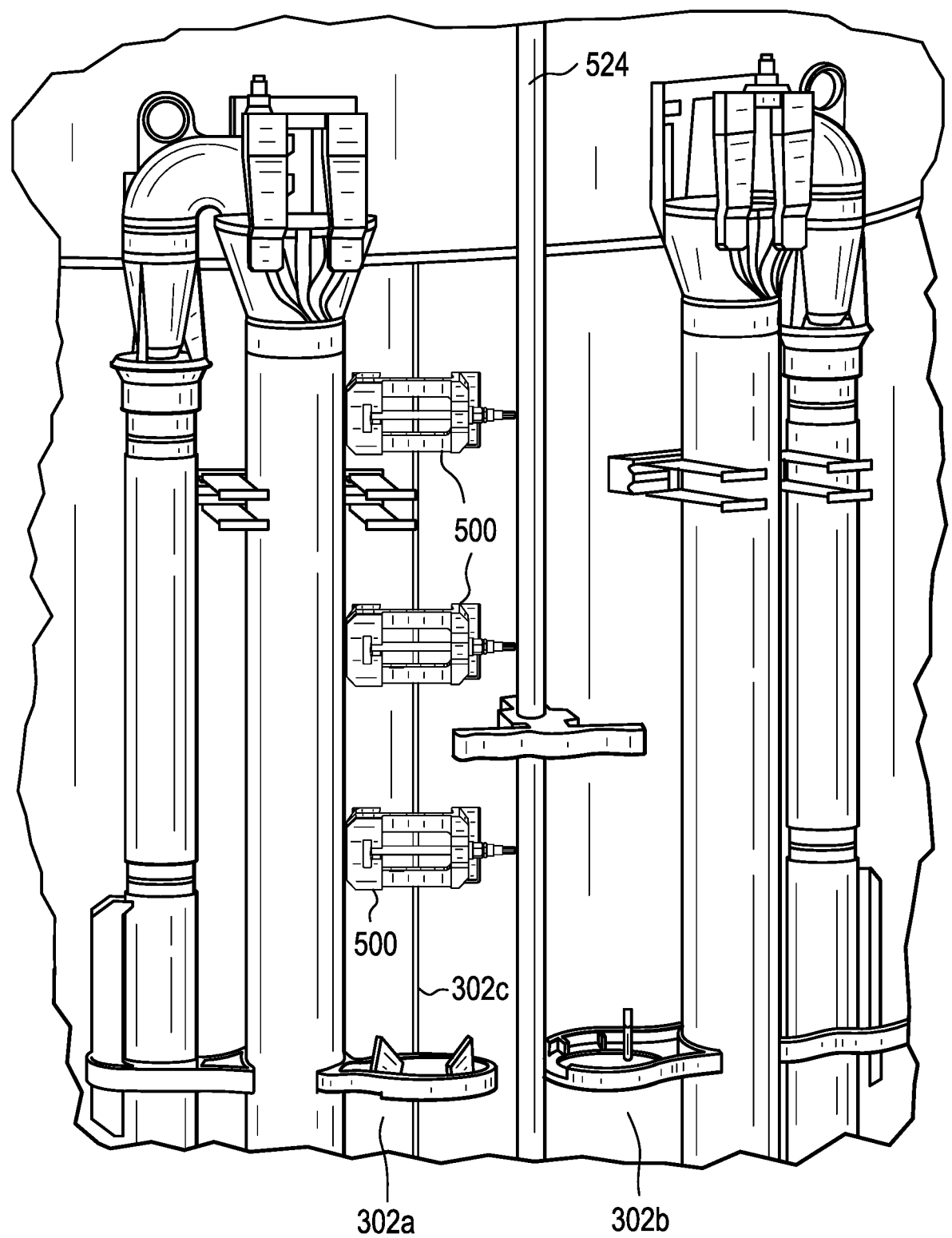
FIG. 5K is a front view of three apparatuses, configured to structurally replace a cracked weld in a nuclear plant, at a vertical seam weld according to some example embodiments.
Figure 5L:
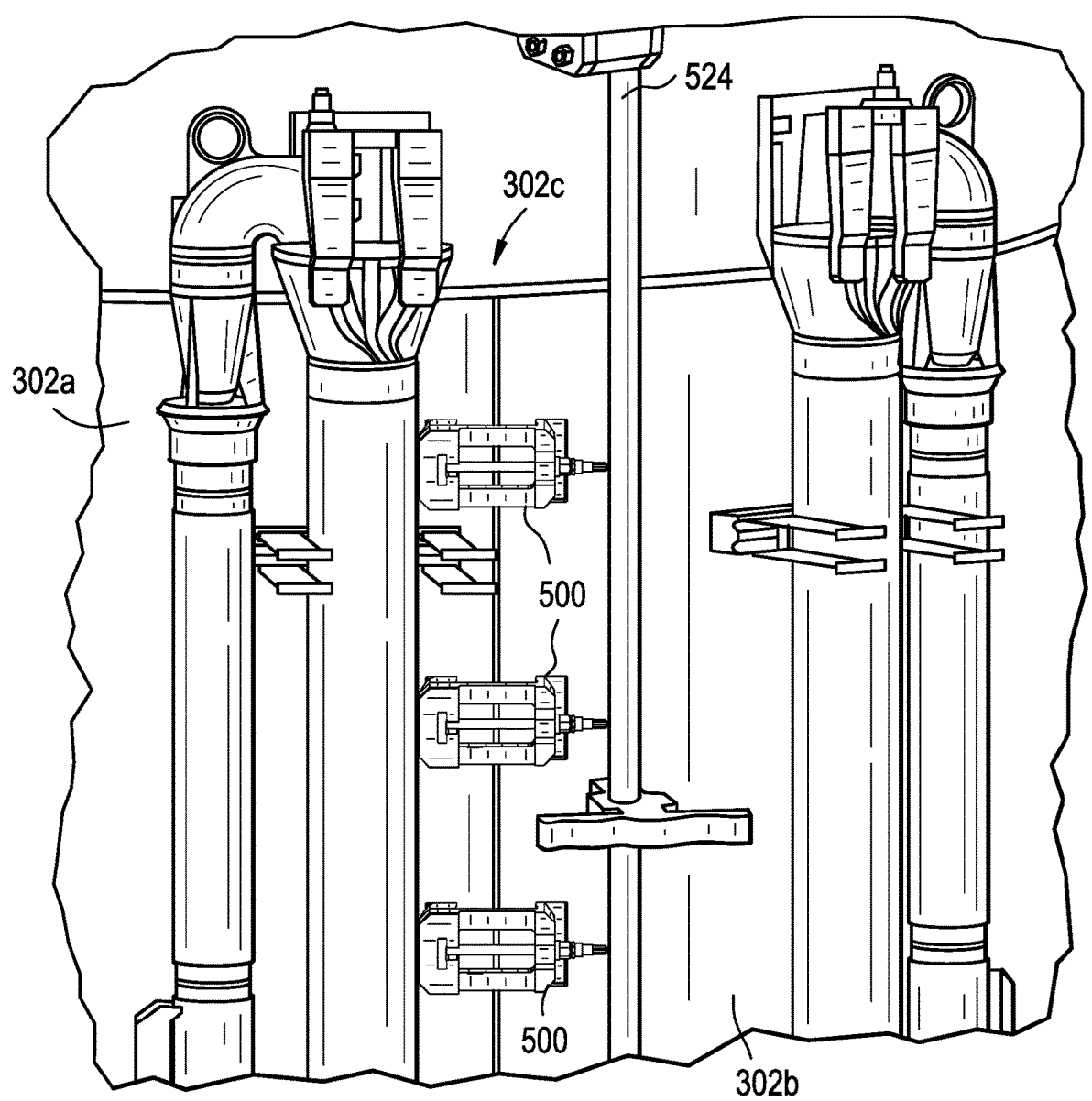
FIG. 5L is an outline view of the three apparatuses of FIG. 5K.

FIG. 5K is a front view of three apparatuses 500, configured to structurally replace a cracked weld in a nuclear plant, at vertical seam weld V5 or V6 according to some example embodiments; and FIG. 5L is an outline view of the three apparatuses 500 of FIG. 5K. A tie-rod 524 is visible in both FIGS. 5K and 5L.

Figure 5M:
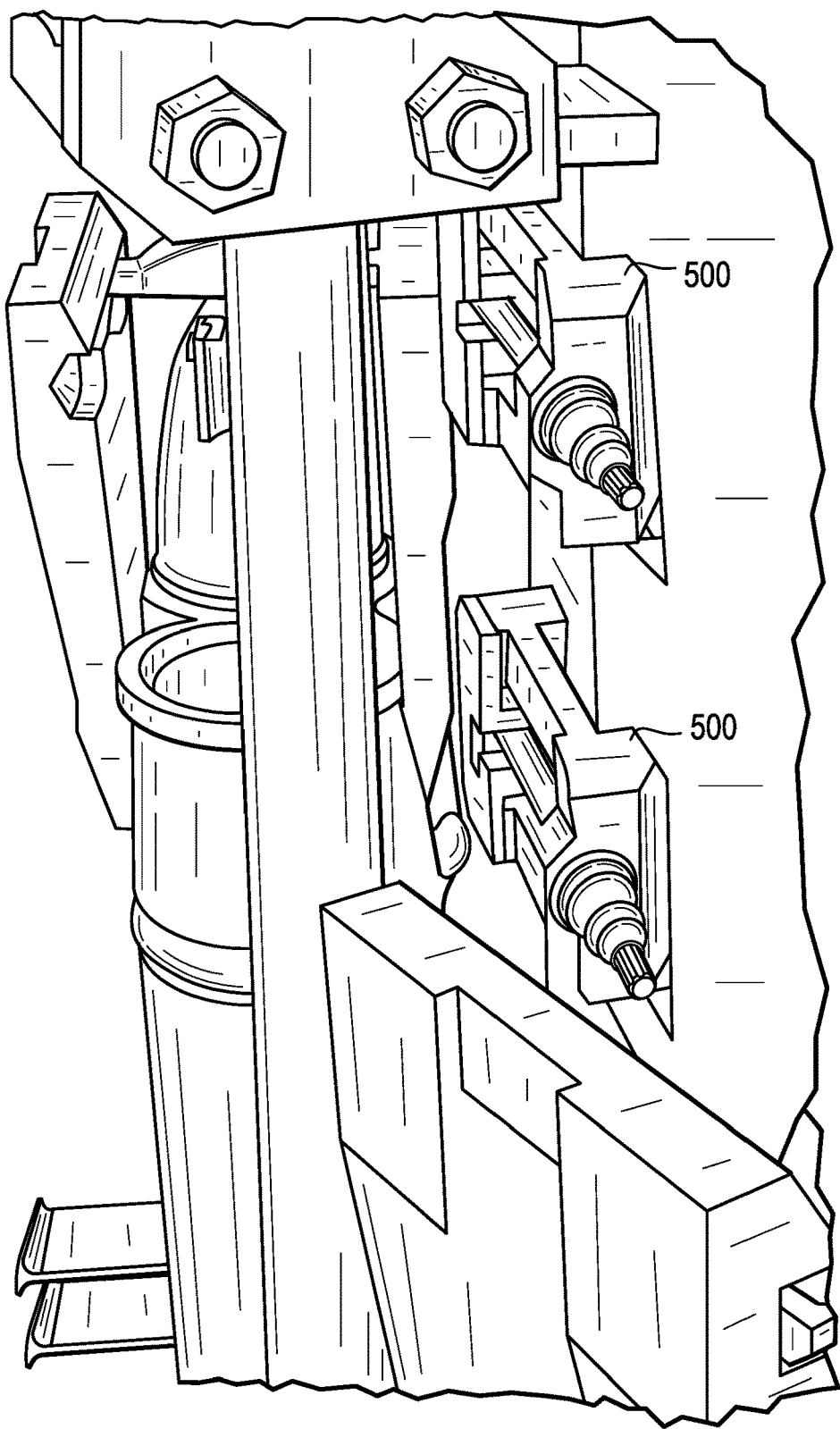
FIG. 5M is a front view of two apparatuses, configured to structurally replace a cracked weld in a nuclear plant, at a vertical seam weld according to some example embodiments.

FIG. 5M is a front view of two apparatuses 500, configured to structurally replace a cracked weld in a nuclear plant, at vertical seam weld V3 or V4 according to some example embodiments; FIG. 5N is a view looking up at the two apparatuses 500 of FIG. 5M; and FIG. 5O is a view looking up at the three apparatuses 500 of FIG. 5K.

As would be understood by a PHOSITA, apparatus 500 may be remotely installed using industry-standard equipment (e.g., attached to a handling pole used by an operator from a servicing platform and tightened using a remotely operated tool).

According to some example embodiments, apparatuses 500 may be scalable in size and the amount of force applied. Thus, there may be trade-offs between the size of the apparatuses 500 used and the number of apparatuses 500 used (e.g., fewer bigger apparatuses 500 versus more numerous smaller apparatuses 500). As would be understood by a PHOSITA, many factors may play into such a decision, such as length of outage, critical path considerations, physical limitations on access to weld 302c, etc.

According to some example embodiments, apparatuses 500 may be easily installed, removed, replaced, or inspected. According to some example embodiments, apparatuses 500 may have a low profile (e.g., when installed, not protruding from core shroud 300 by more than about 4 inches) so as to improve accessibility to weld 302c even if tie-rods associated with core shroud 300 are not removed.

According to some example embodiments, apparatuses 500 may be pre-loaded so as to prevent damage due to vibration, taking into consideration factors such as irradiation relaxation and thermal tightening. According to some example embodiments, apparatuses 500 may be pre-loaded to account for hoop stresses, such as normal, upset, and LOCA hoop stresses. According to some example embodiments, apparatuses 500 may be pre-loaded to account for pressure differences across core shroud 300, such as normal, upset, and LOCA differential pressures.

Figure 6A:
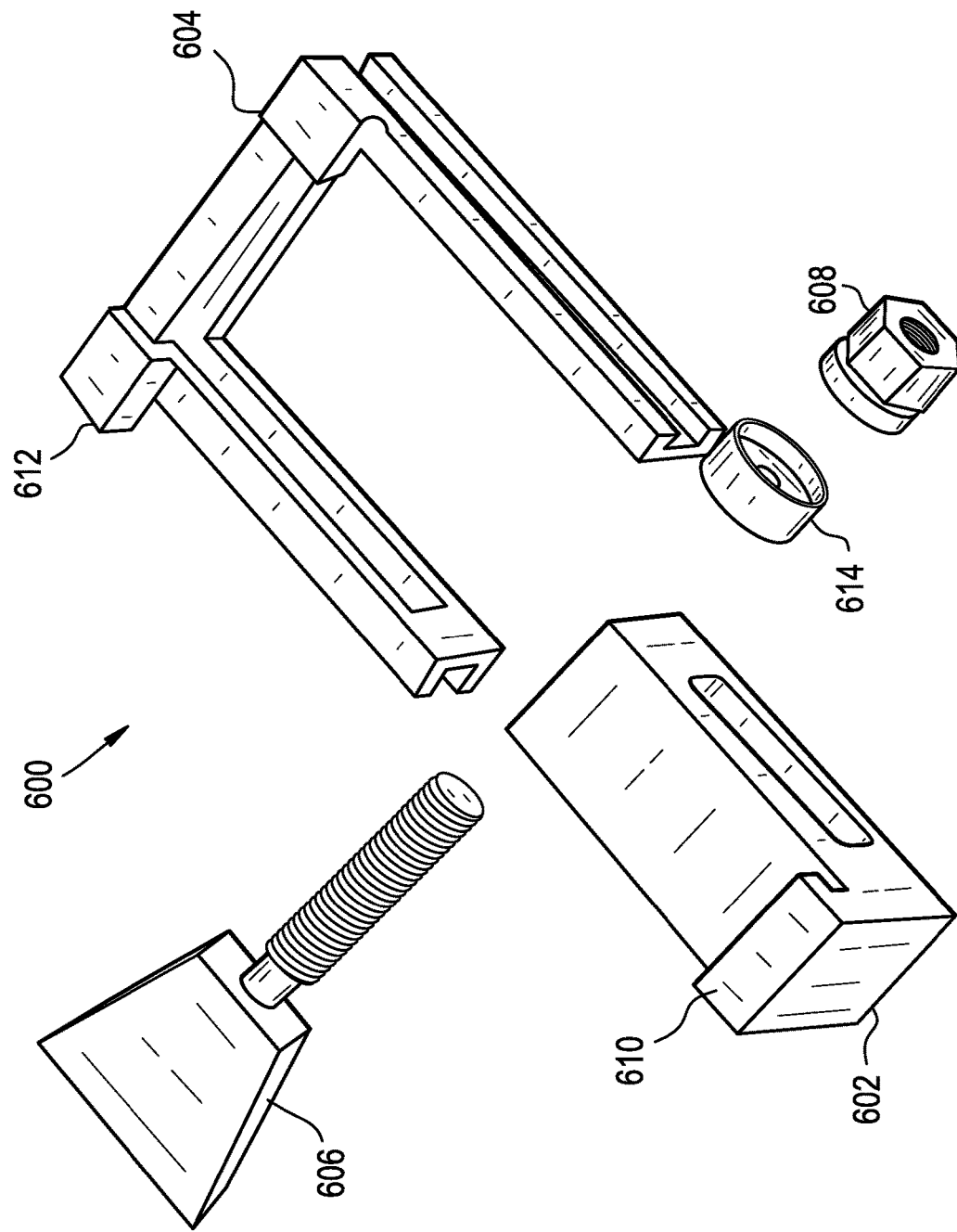
FIG. 6A is a front-side, exploded, perspective view of an apparatus configured to structurally replace a cracked weld in a nuclear plant according to some example embodiments.

FIG. 6A is a front-side, exploded, perspective view of apparatus 600 configured to structurally replace a cracked weld in a nuclear plant according to some example embodiments.

Apparatus 600 may comprise first body portion 602, second body portion 604, wedge portion 606 between first body portion 602 and second body portion 604, and adjustment portion 608. Apparatus 600 may be pre-assembled prior to installation (e.g., on the refueling floor), simplifying that process. Apparatus 600 may be configured to act as a wedge clamp.

First body portion 602 may comprise first gripping portion 610. Second body portion 604 may comprise second gripping portion 612. First body portion 602 may be configured to slidably engage second body portion 604.

Wedge portion 606 may be configured to exert force on the slidably engaged first body portion 602 and second body portion 604. Adjustment portion 608 may be configured to increase or decrease the force exerted by wedge portion 606 on the slidably engaged first body portion 602 and second body portion 604. When adjustment portion 608 increases the force exerted by wedge portion 606 on the slidably engaged first body portion 602 and second body portion 604, a distance between first gripping portion 610 and second gripping portion 612 may decrease, compressing weld 302c (assuming that apparatus 600 is in use to structurally replace a cracked weld).

Adjustment portion 608 may act near an end of wedge portion 606 (e.g., wedge portion 606 may have a threaded end and adjustment portion 608 may be a nut). Tightening the nut may draw wedge portion 606 through the slidably engaged first body portion 602 and second body portion 604, moving first gripping portion 610 and second gripping portion 612 closer together or, if first gripping portion 610 is already gripping slot 328 and second gripping portion 612 is already gripping slot 330, compressing weld 302c.

Adjustment portion 608 may be further configured to prevent the distance between first gripping portion 610 and second gripping portion 612 from increasing.

Conveniently, adjustment portion 608 may be oriented vertically so as to simply the process of mating an operating tool to adjustment portion 608 (e.g., the operating tool may be attached to a handling pole used by an operator from a servicing platform above adjustment portion 608).

Apparatus 600 may further comprise retaining portion 614. Retaining portion 614 may be configured to interact with adjustment portion 608 so as to prevent the distance between first gripping portion 610 and second gripping portion 612 from increasing.

Figure 6B:
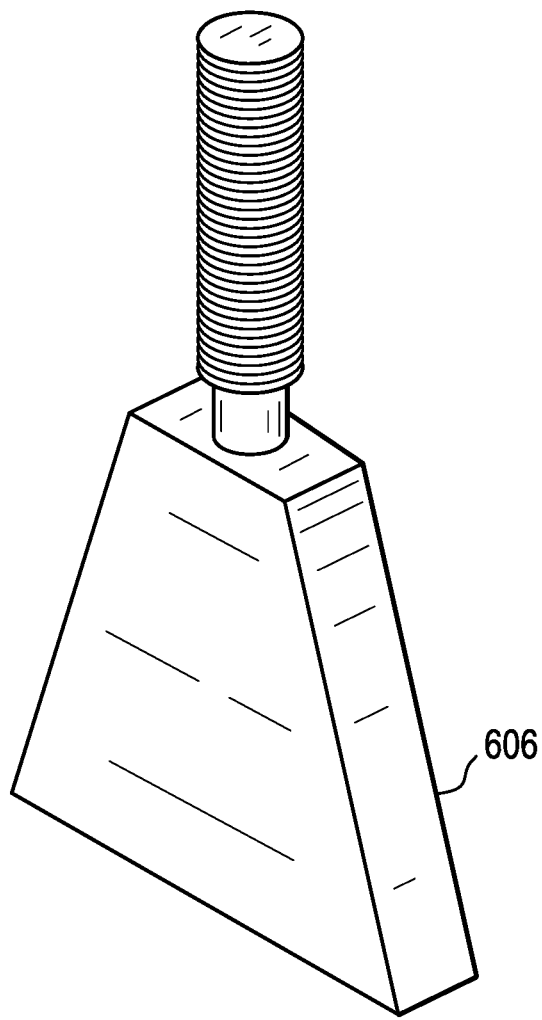
FIG. 6B is an enlarged perspective view of a wedge portion of FIG. 6A.
Figure 6C:
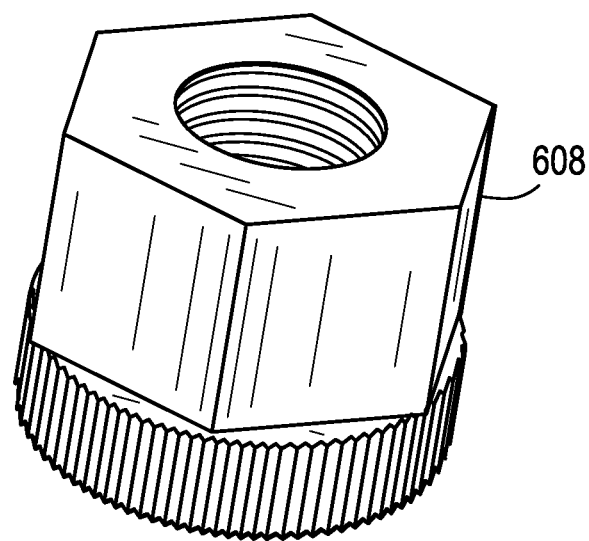
FIG. 6C is an enlarged perspective view of an adjustment portion of FIG. 6A.
Figure 6D:
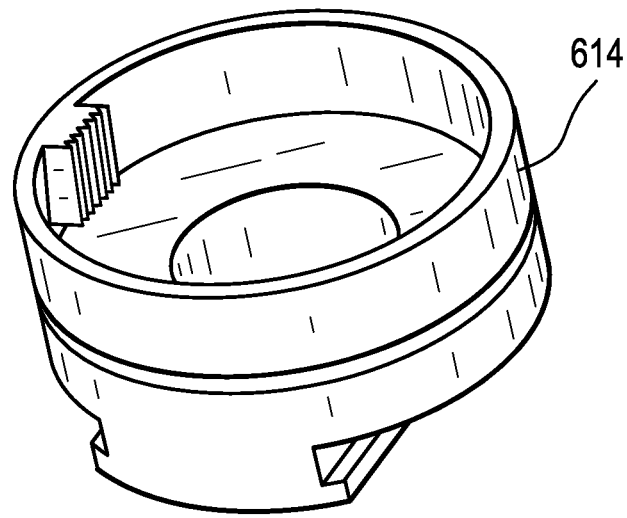
FIG. 6D is an enlarged perspective view of a retaining portion of FIG. 6A.
Figure 6E:
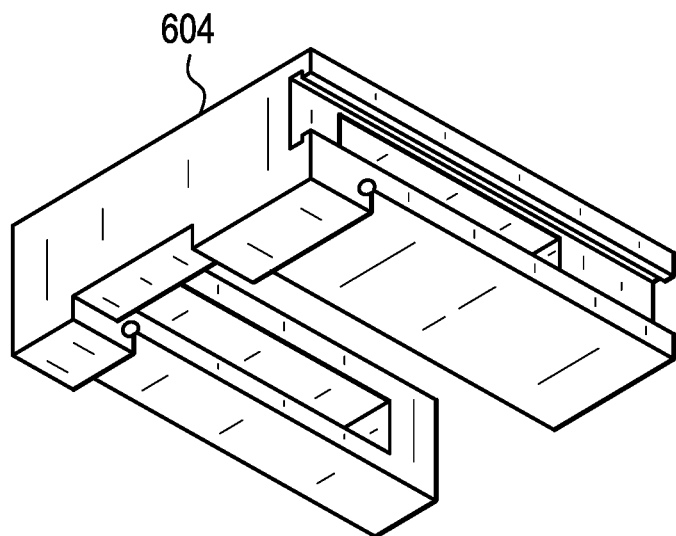
FIG. 6E is an enlarged perspective view of a second body portion of FIG. 6A.
Figure 6F:
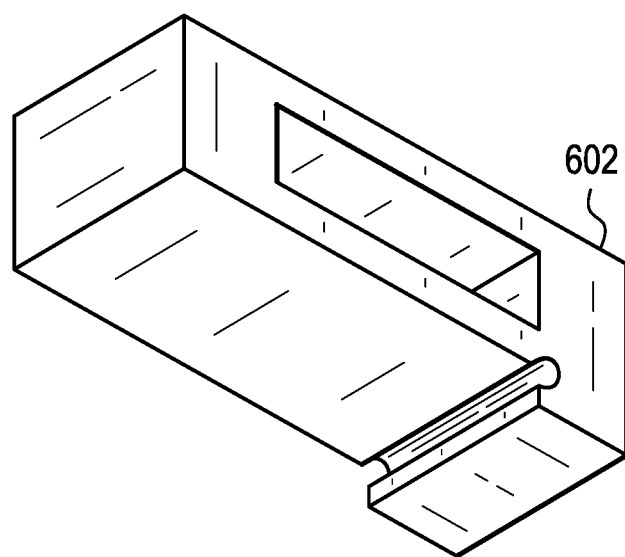
FIG. 6F is an enlarged perspective view of a first body portion of FIG. 6A.
Figure 61:
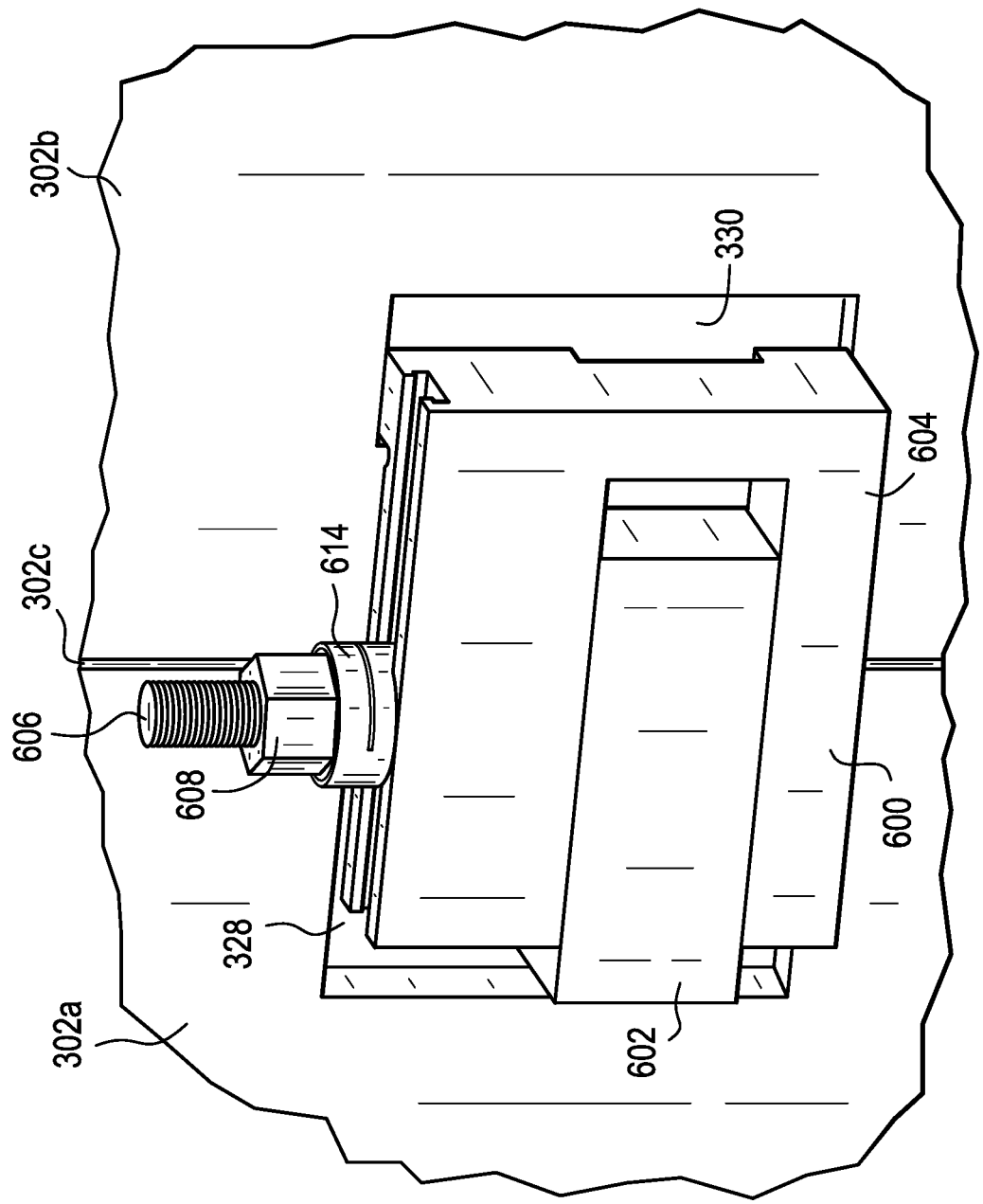

FIG. 6B is an enlarged perspective view of wedge portion 606 of FIG. 6A; FIG. 6C is an enlarged perspective view of adjustment portion 608 of FIG. 6A; FIG. 6D is an enlarged perspective view of retaining portion 614 of FIG. 6A; FIG. 6E is an enlarged perspective view of second body portion 604 of FIG. 6A; and FIG. 6F is an enlarged perspective view of first body portion 602 of FIG. 6A.

Figure 6J:
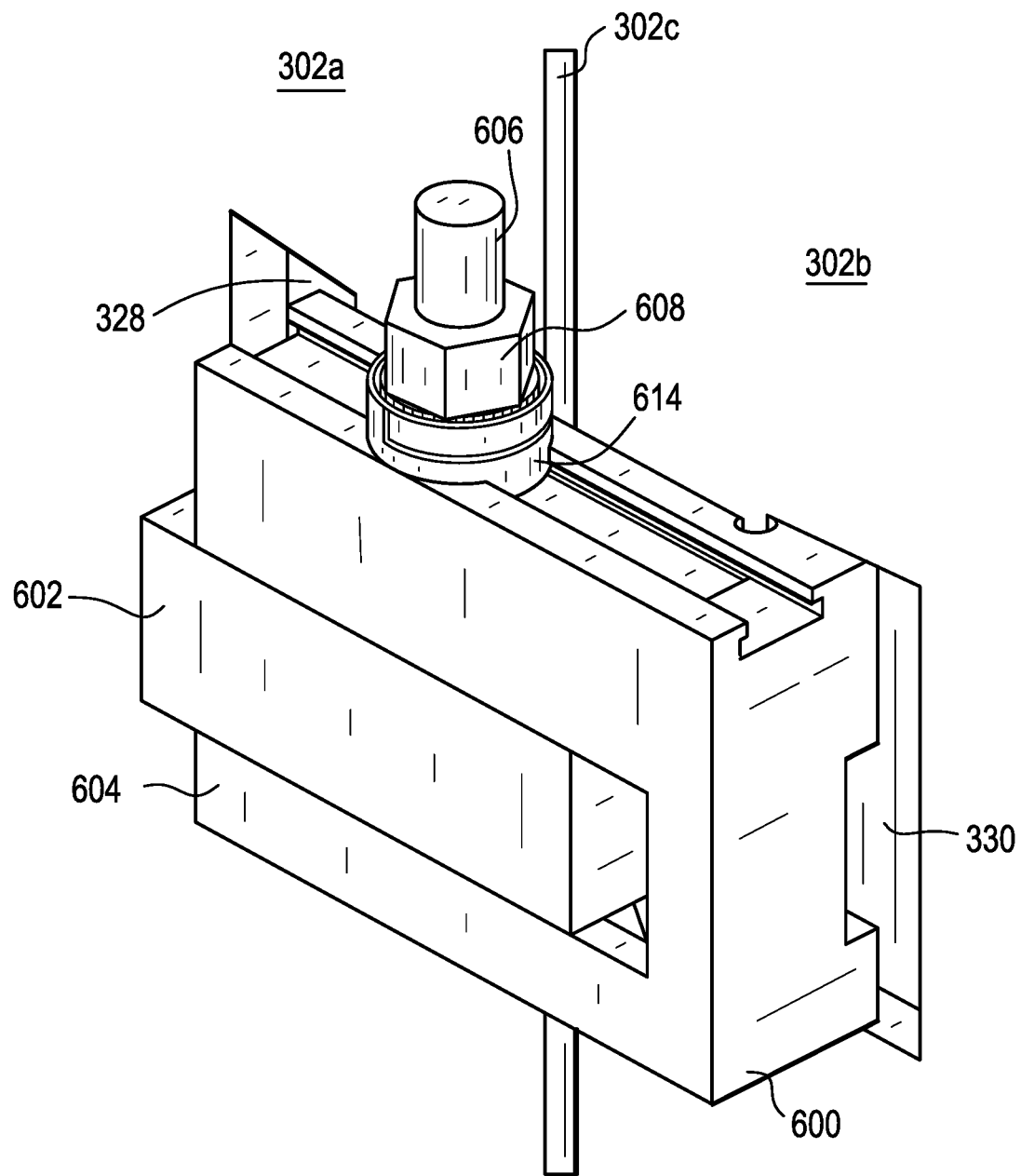
FIG. 6J is a front perspective outline view of the assembled apparatus of FIG. 6I.
Figure 6K:
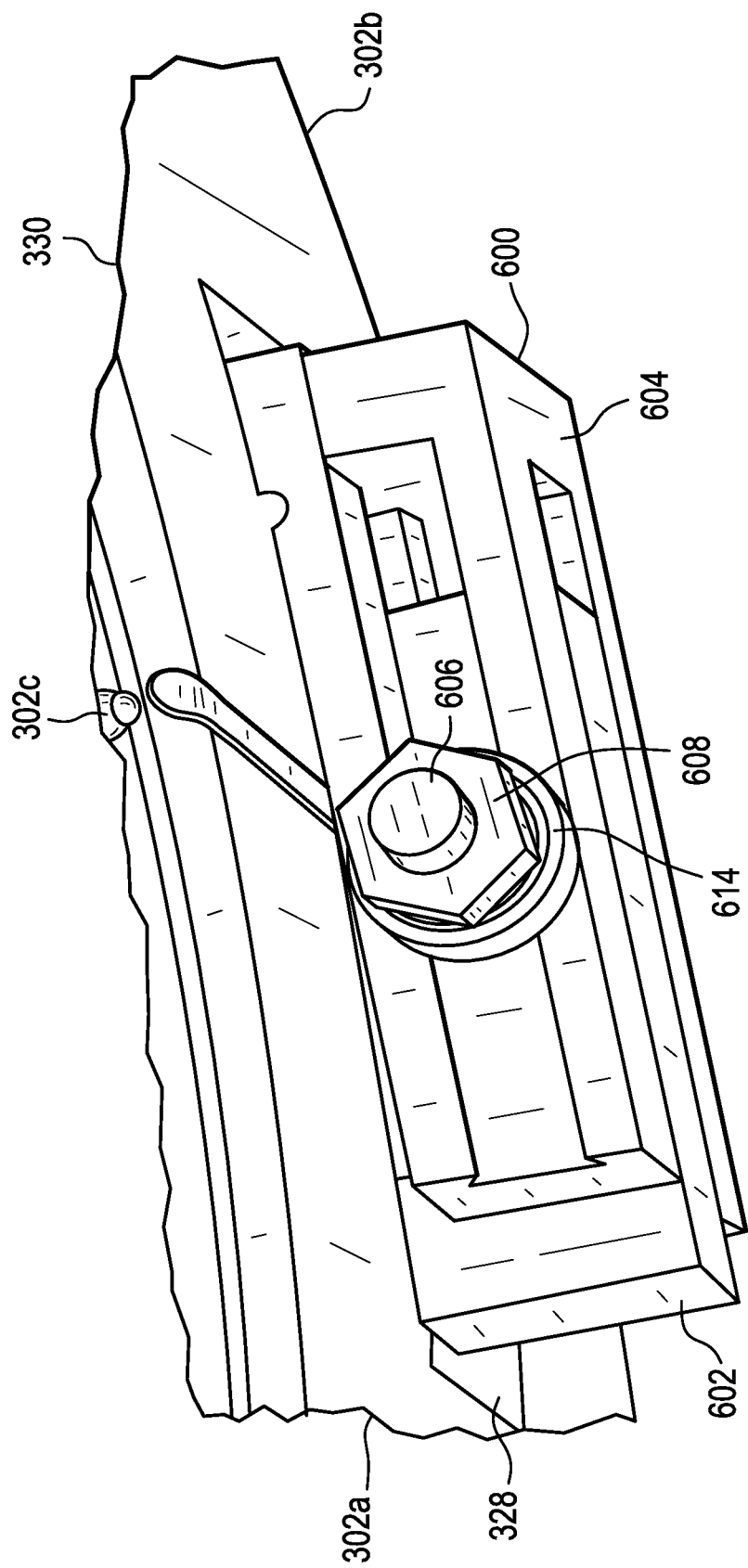
FIG. 6K is a top view of the assembled apparatus of FIG. 6I.
Figure 6L:
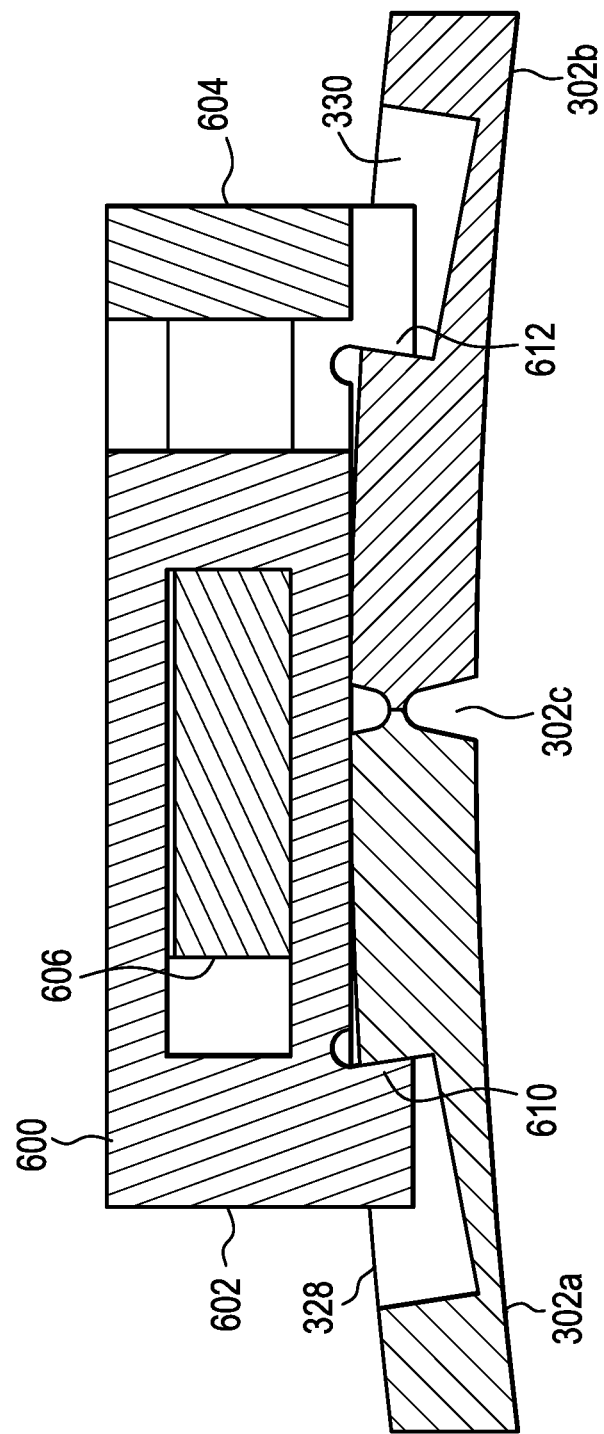
FIG. 6L is a bottom outline view of the assembled apparatus of FIG. 6I.

FIG. 6G is a front perspective view of assembled apparatus 600 configured to structurally replace a cracked weld in a nuclear plant according to some example embodiments; FIG. 6H is a back perspective view of assembled apparatus 600 of FIG. 6G; FIG. 6I is a front perspective view of assembled apparatus 600 of FIG. 6G, with first gripping portion 610 in slot 328 and second gripping portion 612 in slot 330; FIG. 6J is a front perspective outline view of assembled apparatus 600 of FIG. 6I; FIG. 6K is a top view of assembled apparatus 600 of FIG. 6I; and FIG. 6L is a bottom outline view of assembled apparatus 600 of FIG. 6I.

According to some example embodiments, apparatuses 600 may be scalable in size and the amount of force applied. Thus, there may be trade-offs between the size of the apparatuses 600 used and the number of apparatuses 600 used (e.g., fewer bigger apparatuses 600 versus more numerous smaller apparatuses 600). As would be understood by a PHOSITA, many factors may play into such a decision, such as length of outage, critical path considerations, physical limitations on access to weld 302c, etc.

According to some example embodiments, apparatuses 600 may be easily installed, removed, replaced, or inspected. According to some example embodiments, apparatuses 600 may have a low profile (e.g., when installed, not protruding from core shroud 300 by more than about 4 inches or about 100 millimeters) so as to improve accessibility to weld 302c even if tie-rods associated with core shroud 300 are not removed.

According to some example embodiments, apparatuses 600 may be pre-loaded so as to prevent damage due to vibration, taking into consideration factors such as irradiation relaxation and thermal tightening. According to some example embodiments, apparatuses 600 may be pre-loaded to account for hoop stresses, such as normal, upset, and LOCA hoop stresses. According to some example embodiments, apparatuses 600 may be pre-loaded to account for pressure differences across core shroud 300, such as normal, upset, and LOCA differential pressures.

FIG. 7 is a flow chart illustrating a method for structurally replacing a cracked weld in a nuclear plant according to some example embodiments.

As shown in FIG. 7, a method for structurally replacing a cracked weld in a nuclear plant may comprise: obtaining an apparatus that comprises a first body portion comprising a first gripping portion, a second body portion comprising a second gripping portion, a wedge portion between the first and second body portions, and an adjustment portion, wherein the first body portion is configured to slidably engage the second body portion, wherein the wedge portion is configured to exert a first force on the slidably engaged first and second body portions, wherein the adjustment portion is configured to increase or decrease the first force exerted by the wedge portion on the slidably engaged first and second body portions, and wherein when the adjustment portion increases the first force exerted by the wedge portion on the slidably engaged first and second body portions, a distance between the first and second gripping portions decreases (S700); forming slots on both sides of the cracked weld in a structure that includes the cracked weld, wherein the slots do not fully penetrate the structure (S702); disposing the apparatus near a surface of the structure so that the first gripping portion is in a first slot on a first side of the cracked weld and the second gripping portion is in a second slot on a second side of the cracked weld (S704); and using the adjustment portion to increase the first force exerted by the wedge portion on the slidably engaged first and second body portions so as to decrease the distance between the first and second gripping portions until the first gripping portion grips the first slot and the second gripping portion grips the second slot with a second force that structurally replaces the cracked weld (S706).

Figure 8:
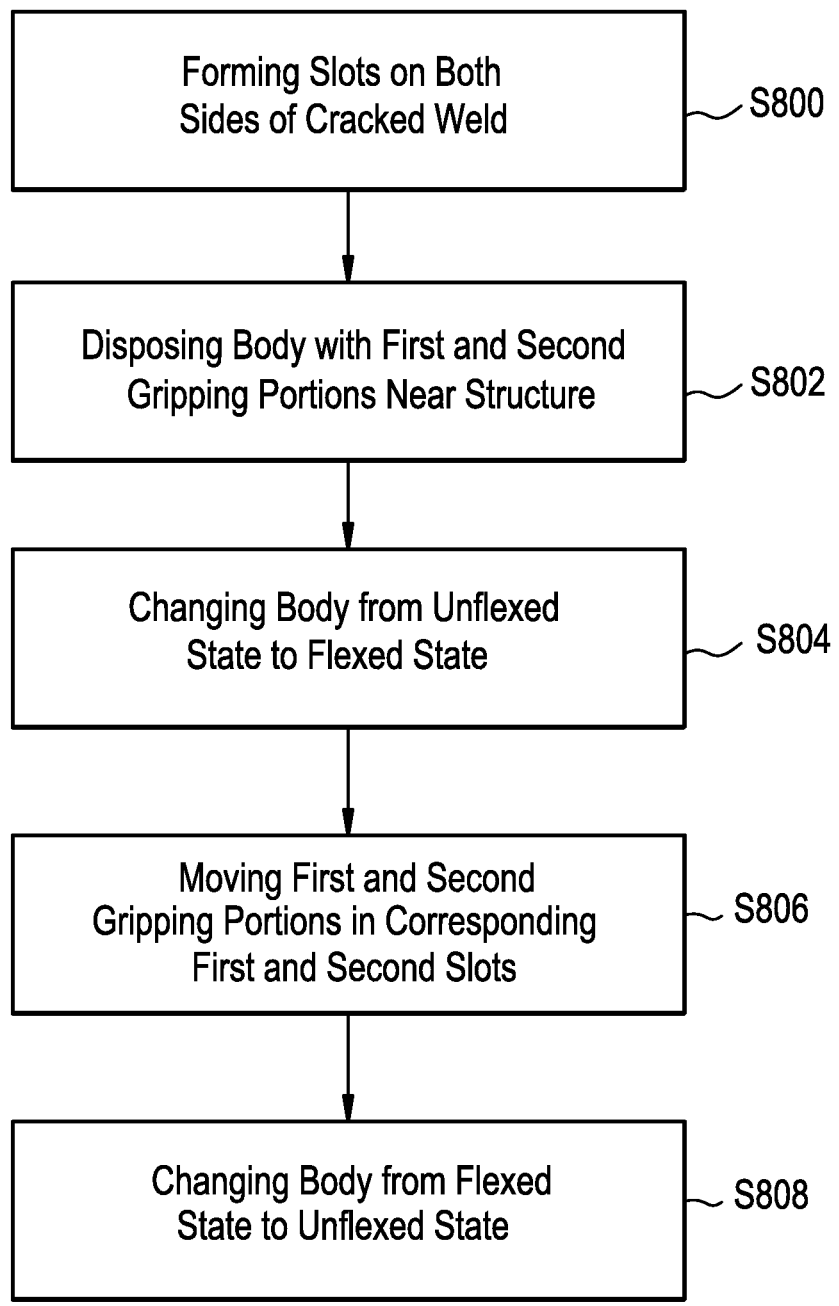
FIG. 8 is a flow chart illustrating a second method for structurally replacing a cracked weld in a nuclear plant according to some example embodiments.

FIG. 8 is a flow chart illustrating a method for structurally replacing a cracked weld in a nuclear plant according to some example embodiments.

As shown in FIG. 8, a method for structurally replacing a cracked weld in a nuclear plant may comprise: forming slots on both sides of the cracked weld in a structure that includes the cracked weld, wherein the slots do not fully penetrate the structure (S800); disposing a body near a surface of the structure, the body comprising a first end, a second end, and a portion between the first and second ends, wherein the first end comprises a first gripping portion, and wherein the second end comprises a second gripping portion (S802); changing the body from an unflexed state in which the first gripping portion and the second gripping portion are a first distance apart to a flexed state in which the first gripping portion and the second gripping portion are a second distance apart, wherein the second distance is greater than the first distance (S804); moving the body in the flexed state so that the first gripping portion is in a first slot on a first side of the cracked weld and the second gripping portion is in a second slot on a second side of the cracked weld (S806); and changing the body from the flexed state to the unflexed state so that the first gripping portion grips the first slot and the second gripping portion grips the second slot with a force that structurally replaces the cracked weld (S808).

Figure 9:
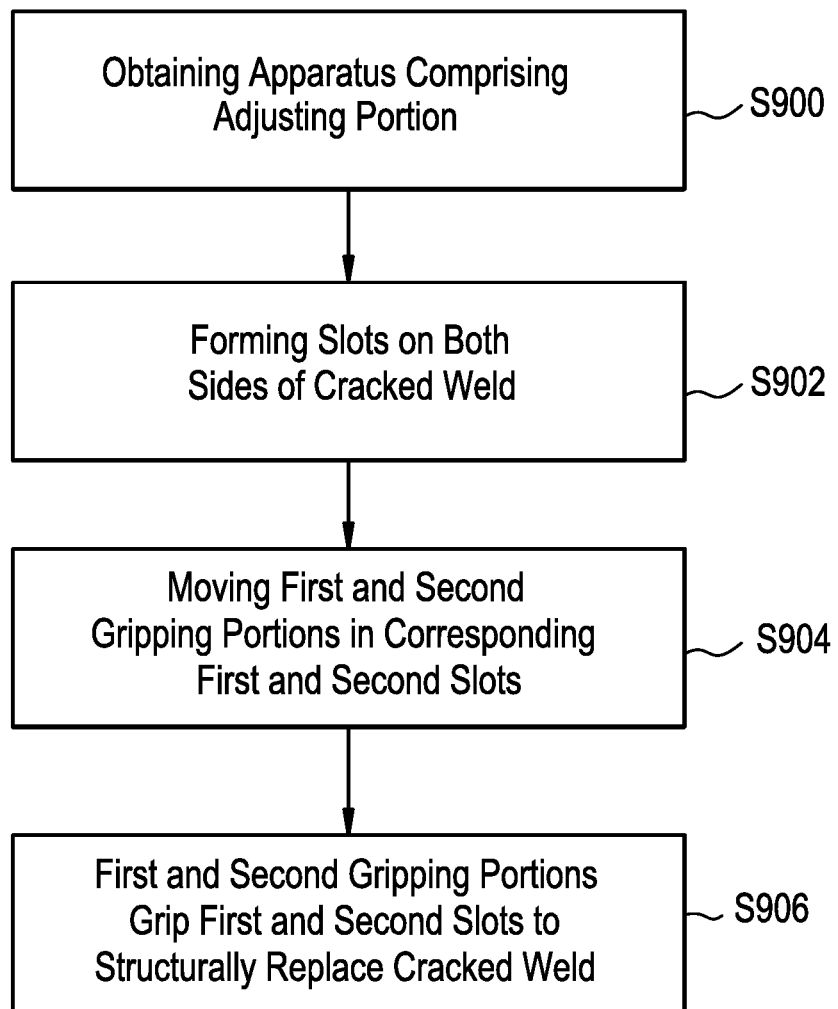
FIG. 9 is a flow chart illustrating a third method for structurally replacing a cracked weld in a nuclear plant according to some example embodiments.

FIG. 9 is a flow chart illustrating a method for structurally replacing a cracked weld in a nuclear plant according to some example embodiments. As shown in FIG. 9, obtaining an apparatus that comprises a first body portion comprising a first gripping portion, a second body portion comprising a second gripping portion, and an adjustment portion, wherein the first body portion is configured to slidably engage the second body portion, wherein the adjustment portion is configured to exert a first force on the slidably engaged first and second body portions, wherein the adjustment portion is further configured to increase or decrease the first force exerted on the slidably engaged first and second body portions, and wherein when the adjustment portion increases the first force exerted on the slidably engaged first and second body portions, a distance between the first and second gripping portions decreases (900); forming slots on both sides of the cracked weld in a structure that includes the cracked weld, wherein the slots do not fully penetrate the structure (902); disposing the apparatus near a surface of the structure so that the first gripping portion is in a first slot on a first side of the cracked weld and the second gripping portion is in a second slot on a second side of the cracked weld (904); and using the adjustment portion to increase the first force exerted on the slidably engaged first and second body portions so as to decrease the distance between the first and second gripping portions until the first gripping portion grips the first slot and the second gripping portion grips the second slot with a second force that structurally replaces the cracked weld (906).

As would be understood by a PHOSITA, although the apparatuses and methods for structurally replacing cracked welds of the present application have been generally described with reference to core shroud 300, the apparatuses and methods for structurally replacing cracked welds of the present application are also applicable to other components in a nuclear plant, and to other components not in nuclear plants.

While example embodiments have been particularly shown and described, it will be understood by those of ordinary skill in the art that various changes in form and details may be made therein without departing from the spirit and scope of the present invention as defined by the following claims.

What is claimed is:

1. An apparatus configured to structurally replace a cracked weld in a nuclear plant, the apparatus comprising:
   a body that comprises a first end, a second end, and a portion between the first and second ends;
   wherein the first end comprises a first gripping portion,
   wherein the second end comprises a second gripping portion,
   wherein when the body is in an unflexed state, the first gripping portion and the second gripping portion are a first distance apart,
   wherein when the body is in a flexed state, the first gripping portion and the second gripping portion are a second distance apart,
   wherein the second distance is greater than the first distance,
   wherein when the body is in the unflexed state, the body has a first shape,
   wherein when the body is in the flexed state, the body has a second shape, and
   wherein the first shape is more curved than the second shape.

2. The apparatus of claim 1, wherein the body comprises metal.

3. The apparatus of claim 2, wherein the metal is stainless steel.

4. The apparatus of claim 1, wherein the portion between the first and second ends defines an access opening.

5. An apparatus configured to structurally replace a cracked weld in a nuclear plant, the apparatus comprising:

a body that comprises a first end, a second end, and a portion between the first and second ends;

wherein the first end comprises a first gripping portion, wherein the second end comprises a second gripping portion, wherein when the body is in an unflexed state, the first gripping portion and the second gripping portion are a first distance apart, wherein when the body is in a flexed state, the first gripping portion and the second gripping portion are a second distance apart, wherein the second distance is greater than the first distance, wherein when the body is in the flexed state, the first gripping portion is configured to enter a first slot on a first side of the cracked weld in a structure that includes the cracked weld and the second gripping portion is configured to enter a second slot on a second side of the cracked weld in the structure that includes the cracked weld, and wherein when the body is in the unflexed state, the first gripping portion is configured to grip the first slot on the first side of the cracked weld in the structure that includes the cracked weld and the second gripping portion is configured to grip the second slot on the second side of the cracked weld in the structure that includes the cracked weld.

6. The apparatus of claim 5, wherein the body comprises metal.

7. The apparatus of claim 6, wherein the metal is stainless steel.

8. The apparatus of claim 5, wherein the portion between the first and second ends defines an access opening.

* * * * *